United States Patent [19]
Okamura

[11] Patent Number: 5,469,414
[45] Date of Patent: Nov. 21, 1995

[54] POSITIONING CONTROL SYSTEM

[75] Inventor: Eiji Okamura, Kawasaki, Japan

[73] Assignee: Fujitsu Limited, Japan

[21] Appl. No.: 980,928

[22] Filed: Nov. 23, 1992

[30] Foreign Application Priority Data

Nov. 22, 1991 [JP] Japan .................... 3-307450
Dec. 9, 1991 [JP] Japan .................... 3-324148

[51] Int. Cl.$^6$ .................................................. G11B 7/00
[52] U.S. Cl. .................... 369/32; 360/78.06; 360/78.05; 360/75
[58] Field of Search ................... 369/32, 43, 44.27, 369/44.28, 44.34, 44.35; 360/77.02, 75, 78.05, 78.06

[56] References Cited

U.S. PATENT DOCUMENTS

| | | | |
|---|---|---|---|
| 4,697,127 | 9/1987 | Stich et al. | 315/561 |
| 4,719,610 | 1/1988 | Bates et al. | 369/32 |
| 4,740,939 | 4/1988 | Kimura et al. | 369/33 |
| 4,754,129 | 6/1988 | Koh | 369/44 |
| 4,775,903 | 10/1988 | Knowles | 360/78.07 |
| 4,779,251 | 10/1988 | Burroughs | 369/32 |
| 4,782,474 | 11/1988 | Arai et al. | 369/44 |
| 4,956,789 | 9/1990 | Hamada et al. | 364/508 |
| 4,972,350 | 11/1990 | Sander et al. | 369/44.28 |
| 5,010,425 | 4/1991 | Asai | 360/78.04 |
| 5,033,039 | 7/1991 | Richgels | 369/43 |
| 5,046,058 | 9/1991 | Shimonou | 369/44.28 |
| 5,050,146 | 9/1991 | Richgels et al. | 369/32 |
| 5,101,386 | 3/1992 | Kojima et al. | 369/32 |
| 5,126,897 | 6/1992 | Ogawa et al. | 360/78.06 |
| 5,164,931 | 11/1992 | Yamaguchi et al. | 369/32 |
| 5,173,647 | 12/1992 | Hashimoto | 360/78.06 |

FOREIGN PATENT DOCUMENTS

| | | |
|---|---|---|
| 0361381 | 4/1990 | European Pat. Off. . |
| 60-32134 | 2/1985 | Japan . |
| 61-113175 | 5/1986 | Japan . |
| 63-23280 | 1/1988 | Japan . |
| 3245375 | 10/1991 | Japan . |
| 3233609 | 10/1991 | Japan . |
| 9010930 | 9/1990 | WIPO . |

OTHER PUBLICATIONS

Hasegawa et al., "Digital Servo Control for Head–Positioning of Disk Drives", *Fujitsu Scientific and Technical Journal*, vol. 26, No. 4, pp. 378–390, Feb. 1991.
Franklin et al., "Case Design: Disk–Drive Servo", *Digital Control of Dynamic Systems*, Chapter 12, pp. 703–751, 1990.

*Primary Examiner*—Robert J. Pascal
*Assistant Examiner*—Tan Dinh
*Attorney, Agent, or Firm*—Greer, Burns & Crain, Ltd.

[57] ABSTRACT

A positioning control system for a controlled device, such as a disk drive head, estimates a moving time for moving the controlled device from a current position of the controlled device to a newly designated position. The system sets the estimated moving time as a target moving time. Positioning elements then move the controlled device to the designated position in response to the target moving time. Positioning elements may include an actuator for moving the controlled device, a position detector for tracking movement of the controlled device, and a control element for controlling the actuator. The control element calculates a trajectory for the controlled device to follow based on the target moving time, and controls the actuator based on the calculated trajectory and controlled device position as determined by the position detector. The control system may also have a position correcting element included in the control element. The correcting element compares the actual position of the controlled device with a calculated position of the controlled device and makes necessary adjustments.

17 Claims, 25 Drawing Sheets

POSITIONING CONTROL SYSTEM

BACKGROUND OF THE INVENTION

1. Field of the Invention

The present invention relates to a positioning control system for positioning a magnetic head or the like controlled device at a high speed.

There is recently a tendency to demand, in a computer system, a transfer of large amounts of data at high speed, and therefore, auxiliary memory devices such as a magnetic disk drive and optical disk drive are also required to transfer large amounts of data at high speed to exchange data with a host device. To meet this requirement, it is essential for magnetic disk drives and optical disk drives, etc., to have a recording medium, e,g., a disk, having a high density recording surface (e.g., a track pitch thereof is less than 10 µm).

A storage device such as a magnetic disk drive and an optical disk drive executes a so-called head seek operation for moving a head to a designated target track (target cylinder) position from a current track (cylinder) position on a disk by controlling an actuator. When the head is positioned to the designated target track position, a data writing or reading operation is carried out through the head, Further, in a printer, X-Y plotter, or the like recording apparatus, recording such as printing is carried out by moving and positioning a print head to the target position from the current position. These positioning controls are required to have a high speed positioning capability without generating vibrations on the actuator or the like. Further, the magnetic disk drive including a plurality of magnetic heads mounted on an actuator is required to position these magnetic heads at a high speed in consideration of deviations from normal track positions on the respective disks where the individual magnetic heads shoulds be positioned and displacements among the respective magnetic heads.

2. Description of the Related Art

The magnetic disk drive is, for example, constructed as shown in FIGS. 1(A) and 1(B). FIG. 1(A) is a schematic plan view of the magnetic disk drive, and FIG. 1(B) is a schematic side view thereof. The reference numeral 50 denotes magnetic disks, 51 a rotatable shaft, 52 an actuator, 53 arms, 54 gimbals, 55 core sliders, 56 a rotatable shaft. Ten magnetic disks 50 are fixed on the rotatable shaft 51, and are rotated by an unillustrated motor. It may be also appropriate to secure one or two magnetic disks 50 on the rotatable shaft 51. The core slider 55 is supported on each arm 53 through two gimbals 54, such that the core sliders 55 are opposed to opposite faces of the magnetic disks 50. When the arms 53 are rotated about the rotatable shaft 56 of the actuator 52, the core sliders 55 are moved radially of the magnetic disks 50. Thereupon, the magnetic heads are positioned at designated tracks, and data are written or read in or from the magnetic disks 50.

In such a magnetic disk drive, upon designation of the target track, the head is moved to the target track position on the disk by the actuator including a voice coil motor, etc., and data are written or read in or from the target track. In this case, for example, a target speed curve as shown in FIG. 2 is given from a table or the like in correspondence with the number of tracks between the present track position and the target track position. This target speed curve is representative of a deceleration characteristic for causing the head rotating at a given speed to stop at the target track position. The actuator is controlled according to the difference between the actual speed of the head and the target speed curve. Accordingly, the actuator is driven with a maximum possible driving force at the start of the head seek operation since the speed difference is large thereat. After the actual speed of the head coincides with the target speed curve, the deceleration control is executed in accordance with the target speed curve. This control (it is also referred to as a bang-bang control) is in general realized with a construction in which an analog computation is executed. Thus, there has been high likelihood of generating vibrations at the start of the head seek operation, because the actuator is driven with such a driving force as to saturate a power amplifier and the acceleration of the head varies greatly.

There is also known a system for controllably positioning the head by means of a digital computation using a digital signal processor(DSP). For example, a control system was previously proposed, in which such theoretically optimum trajectories as to cause a mechanism mounting the head to accelerate or decelerate upon being subjected to a low impact is obtained by means of the digital computation, and feedback and feedforward controls are executed so as to follow the trajectories (Japanese Unexamnined Patent Publication No. 3-233609, the related US, EPC, CA and KR patent applications are copending). In this control system, target trajectories are set as trajectories of the acceleration a, the speed v, and the position x which are expressed as low order algebraic functions of time as shown in FIG. 3, and the actuator is controlled so that the above variables follow these trajectories. A horizontal axis represents normalized time $t_n$, while a vertical axis represents normalized values. An equation of motions of a system for moving a mass by a given distance L is as follows:

$$\frac{d}{dt}\begin{vmatrix} x \\ v \\ a \end{vmatrix} = \begin{vmatrix} 0 & 1 & 0 \\ 0 & 0 & 1 \\ 0 & 0 & 0 \end{vmatrix}\begin{vmatrix} x \\ v \\ a \end{vmatrix} + \frac{Kf}{M}\begin{vmatrix} 0 \\ 0 \\ 1 \end{vmatrix} u \tag{0}$$

wherein boundary conditions are:

$$\begin{vmatrix} x \\ v \\ a \end{vmatrix}_{t=0} = \begin{matrix} 0 \\ 0 \\ 0 \end{matrix} \tag{0a}$$

$$\begin{vmatrix} x \\ v \\ a \end{vmatrix}_{t=T} = \begin{matrix} L \\ 0 \\ 0 \end{matrix} \tag{0b}$$

Here, x moved position, v=moving speed, a=acceleration, u=driving amount, M=mass, Kf=force constant, and T=target time for moving. It will be appreciated that Kf is a force constant which is referred to as BL [N/A] of the voice coil motor in the magnetic disk drive. The boundary conditions of the equation (0) at t=0, t=T are shown in equations (0a), (0b) respectively.

In designing the target trajectories, the target position $x_{obj}$, the target speed $V_{obj}$, and the target acceleration $a_{obj}$ are so set as to satisfy the equation (0). The optimum trajectories in the previously proposed invention are the ones which minimize an estimation function $J=\int(0\sim T)\,(da/dt)^2 dt$ (where $\int(0\sim T)$ is an integration on an interval between t=0 and t=T. Functions representing those trajectories are shown in the following equations:

$$x_{obj}/L = t_n^3\,(10 - 15t_n + 6t_n^2) \tag{1}$$

$$v_{obj}/(L/T) = 30t_n^2\,(1 - t_n^2) \tag{2}$$

$$a_{obj}/(L/T^2) = 120t_n\,(1 - t_n)(0.5 - t_n) \tag{3}$$

wherein t denotes an elapsed time, T a target time, L a moving distance, and $t_n=t/T$ denotes a normalized time. FIG. 3 described above shows normalized values of the target position, the target speed, and the target acceleration defined in the equations (1) to (3) by curves x0, v0, and a0, and the horizontal axis thereof represents a normalized time $t_n=t/T$.

Here, when the digital computation is executed using the DSP, the reason why the above-mentioned functions composed of a plurality of polynomials are utilized purposely will be briefly explained. Generally, the DSP has a control function which allows the program for digital computation including many digital filters to be excuted. To realize the positioning of the magnetic head, etc., at high speed, such a computation must be processed rapidly in real time. It has been confirmed that the speed of the digital computation for the digital functions composed of polynomials is higher than the speed thereof for analog functions composed of sine function, etc. In this case, the digital functions are essentially constituted by a number of polynomials in which a constant sampling period is defined as a basic parameter. Accordingly, in the case where the DSP is utilized, it is preferable that a target trajectory of a magnetic head, etc., should be designed by using functions composed of polynomials.

The trajectories represented by the equations (1) to (3) which will minimize the estimation function J are those to minimize a variation in the acceleration or deceleration during a moving time. Thus, the head can be moved stably. However, the settling after the head is completely moved is not considered. More specifically, the target acceleration during the movement is given by the equation (3), and the target speed and the target acceleration both become zero after the movement. Accordingly, $(da_{obj}/dt)$ becomes infinite at t=T, and the variation of the target acceleration becomes discontinuous at t=T. In view of this, it can be considered to extend an integration range so as to includes a settling period after the movement in addition to the interval (0~T). However, in this case, the trajectories obtained in accordance with the equations (1) to (3) are not optimum. In the case where the settling period after the movement gives a great influence on an access performance as in the disk device, it is necessary that $(da_{obj}/dt)$ is continuous at t=T.

Further in the case where the actual position, the actual speed, and the actual acceleration are so controlled as to follow the target trajectories determined in accordance with the equations (1) to (3), the actual measurement values generally follow the target trajectories constantly with some delays. There are also cases where the actual trajectories fluctuate in the vicinity of the target trajectories due to the disturbances and variations of control parameters. For instance, in the case where the force constant in the disk device (a constant indicative of proportion between the force generated by a current supplied to the voice coil motor and the current) is larger than a design value due to the dispersion or other cause, the actual position trajectory goes ahead of the target position trajectory, and the head reaches the target position before the speed becomes zero. For instance, the actual position $x_r$, the actual speed $v_r$, and the actual acceleration $a_r$ become as indicated by dotted lines as opposed to the target position $X_{obj}$, the target speed $V_{obj}$, and the target acceleration $a_{obj}$ indicated by solid lines in FIG. 13. Since neither the target speed $v_{obj}$ nor the target acceleration $a_{obj}$ is zero at time (T−∈) when the actual position $x_r$ becomes zero, the feedback control is executed so as to make the target speed $v_{obj}$ and the target acceleration $a_{obj}$ zero. The actual speed $v_r$ and the actual acceleration $a_r$ vary greatly in this case, and accordingly the actual position $x_r$, the actual speed $v_r$, and the actual acceleration $a_r$ vary as if they were damped oscillation as indicated by the dotted lines respectively. Therefore, the previously proposed invention suffers a problem of a longer adjustment time to position the head accurately at the target position $x_{obj}$.

The positioning control system using the trajectories determined by the equations (1) to (3) is obliged to have such a construction as to use the feedforward control a great deal, and accordingly has the problem that the phenomena as shown in FIG. 4 occur frequently on the ground that the target trajectories and the actual trajectories differ greatly when the parameters of controlled devices such as the head and the actuator vary. In other words, this system is susceptible to variations of the control system per se and external disturbances and therefore has poor robustness and accordingly has a problem especially in respect of mass production.

On the other hand, as a track density of a magnetic disk drive, etc., becomes higher, a displacement, i.e., position error (an amount of offset, about 2 μm) between the respective data head, which may occur due to a thermal offset and thermal eccentricity, etc., cannot be neglected. Further, such a displacement is a function of a rotational position of a magnetic disk, etc. Furthermore, curves of an amount of displacement of the respective tracks are different from each other. Therefore, to overcome the trouble of displacement, it is essential for the follow control of the designated track to be executed by utilizing servo surface servo system including an exclusive servo cylinder, data surface servo system in which any one of data recording surfaces is set as a reference surface, or a hybrid servo system in combination of the other two servo systems.

In this case, there exist points to be considered especially when the above control system is applied to the data surface servo system (or embedded servo system) and the hybrid servo system. For instance, as shown in FIG. 1(B), displacement occurs among the magnetic heads in the magnetic disk device provided with a plurality of magnetic heads. The displacement occurs due to a thermal change (thermal off track) of the head suspension mechanism (arms 53, gimbals 54, etc.), and eccentricity among a plurality of magnetic disks. An amount of displacement varies according to at which sector positions of the tracks the heads are located. Accordingly, in the data surface servo system and hybrid servo system, the displacement is required to be corrected. A correction amount for displacement is determined by a head selection address (Hdsel) information (head number), a sector counter (SctCtr) (sector number) which indicates at which sector the head is located. A conventional method of calculating the correction amount for displacement will be described with respect to a cylinder servo system which is one of the hybrid servo systems.

According to this cylinder servo system, a servo position information is recorded on a certain dedicated servo surface and on a special cylinder of a data surface. The position information on the dedicated servo surface is the same as the one used in the servo dedicated surface system, and a two-phase servo signal system and the like are frequently adopted therein. On the special cylinder (cylinder other than normal cylinder for recording data) of the data surface are continuously recorded single-phase signals as shown in FIG. 5(a). More specifically, the signals are recorded along the track on AGC sections on opposite sides of a center line of a track $TR_n$, on a PosA section on a side closer to a track $TR_{n-1}$, and on a PosB section closer to a track $TR_{n+1}$. FIG. 5(b) shows an example of a read signal; FIG. 5(c) shows a sector pulse; FIG. 5(d) shows an AGC enable timing signal; FIG. 5(e) shows an amplitude detecting signal; and FIG. 5(f) shows a sampling timing signal.

When the data magnetic head is positioned in the center of the track $TR_n$, the amplitude of a reproduced signal in the PosA section is equal to that of a reproduced signal in the PosB section. However, when the head is displaced from the center of the track, the amplitude of the reproduced signal in the PosA section differs from that of the reproduced signal in the PosB section as shown in FIGS. 5(b) and 5(e), and accordingly the displacement amount is detected as (PosA−PosB). More specifically, the reproduced signal in the AGC section is AGC amplified using the sector pulse shown in FIG. 5(c) as a reference, so that the amplitude of the reproduced signal is maintained at a specified value during a period of T0. The AGC function is held beyond the period of T0. The next reproduced signal in the PosA section is subjected to the sampling in accordance with the sampling timing signal shown in FIG. 5(e) at time T1 given by the sector pulse, and is converted into a digital signal. The next reproduced signal in the PosB section is subjected to the sampling in accordance with the sampling timing signal shown in FIG. 5(f) at time T2 given by the sector pulse, and is converted into a digital signal. The displacement amount can be obtained by taking the difference between the two digital signals. For example, if PosA<PosB, the head is displaced more toward the track $TR_{n+1}$. Conversely, if PosA>PosB, the head is displaced more toward the track $TR_{n-1}$. The displacement amount corresponds to the difference (PosA−PosB). It is also appropriate to provide amplitude detecting circuits for two channels. With this arrangement, the amplitudes of the reproduced signals in the PosA and PosB sections can be maintained at the specified level, the difference (PosA−PosB) can be obtained in analog form by a differential amplifier, and the obtained difference is AD-converted at time T2.

The servo information is read from the special track of the data surface and is compared with the serve information from servo dedicated surface, to thereby calculate the displacement between the data head and servo head. Accordingly, the displacement amounts can be stored in a position correction table, and the positions of the heads can be corrected in accordance with this table. This position correction table is a two-dimensional table which is accessed according to the head selection address (Hdsel) information and a content of the sector counter (SctCtr). Further, in the case where the data surface servo system is adopted rather than the hybrid system, one of the data surfaces is used as a reference surface because there is no servo dedicated surface, and the displacement amounts of the other data surfaces relative to this reference surface are stored in the position correction table. In this way, the positions of the heads can be corrected similar to the former case.

When the trajectories are calculated to execute the positioning control so as to correct the position of the head as described above, there are given a moving cylinder number $L_0$ which is the number of cylinders the head is to be moved over, an old head selection address Hold, and a new head selection address Hnew as an instruction from the host device, e.g. a host computer. If it is assumed that a current count value of the sector counter is Sold and a count value thereof when the movement is completed is Snew, an entire moving distance L is expressed as follows.

$$L = L_0 + L_{c1} - L_{c0} \quad (4)$$

$$L_{c0} = \text{PosCorr [Sold, Hold]} \quad (5)$$

$$L_{c1} = \text{PosCorr [Snew, Hnew]} \quad (6)$$

wherein $L_{c0}$ denotes a position correction value at the current position, $L_{c1}$ denotes a position correction value when the movement is completed, and Poscorr [] denotes a position correction table.

In the equations (4) to (6), the sector count value Snew is an unknown value, and accordingly the entire moving distance L cannot be calculated unless it is accurately estimated at which sector the head is located when the head is moved by the moving cylinder number $L_0$. In the above method according to a prior art, the trajectories cannot be calculated, since the count value Snew of the sector counter when the movement is completed is unknown. If the positioning control is executed in disregard of the position corrected values $L_{c0}$, $L_{c1}$, the calculated trajectories do not give the necessary moving distance. This causes a great control error when the movement is completed, thereby deteriorating the characteristic of regulating the positioning.

SUMMARY OF THE INVENTION

To treat these problems, the main object of the present invention is to provide a positioning control system which enables a controlled device, e.g., a magnetic head in a magnetic disk drive, etc., to be positioned stably and at high speed.

A further object of the present invention is to provide a positioning control system which enables a stable follow control to be executed after the controlled device such as magnetic head has arrived at a designated position.

A still further object of the present invention is to provide a stable positioning control system which prevents an acceleration of the controlled device when it has arrived at the designated position from changing abruptly.

A still further object of the present invention is to provide a positioning control system which is stable for variations of parameters of the control system per se and external disturbances and has an excellent robustness.

A still further object of the present invention is to provide a positioning control system in which an amount of displacement of the controlled device when the controlled device has arrived at a designated position can be predicted and a target trajectory of the controlled device can be corrected previously.

A still further object of the present invention is to provide a positioning control system which can be applied to the magnetic disk drive.

A still further object of the present invention is to provide a positioning control system which can be applied to the optical disk drive.

A still further object of the present invention is to provide a positioning control system which can be applied to a printing device.

To attain these objects, the positioning control system according to the present invention for a controlled device is adapted to easily estimate an arrival time that the controlled device takes from a current position of a controlled device to a designated position thereof and to set the estimated arrival time as a target moving time, when the controlled device is positioned at the designated position.

Preferably, the positioning control system comprises drive means for moving and positioning a controlled device at the designated position; position detecting means for detecting the position of the controlled device; and arithmetic control means for controlling the drive means in accordance with the position of the controlled device detected by the position detecting means and the designated position. Further, the arithmetic control means includes trajectory generating means for calculating target trajectory in accordance with an entire moving distance between a current position of the controlled device and the designated position; and follow control means for controlling the drive means in accordance with the target trajectory from the trajectory generating means and the position of the controlled device detected by the position detecting means so that the controlled device is moved following the target trajectory. Further, the trajectory generating means calculates the target trajectory using an algebraic polynomial representing an acceleration-deceleration pattern which at least makes a derivative of a target acceleration zero at the designated position where movement of the controlled device is completed, so that the target acceleration changes smoothly, and the follow control means positions the controlled device while causing the same to follow the target trajectory.

Further preferably, in the positioning control system, the target trajectory is expressed by a polynomial, $V_0 (t/T)^k [1-(t/T)]^j$, where T denotes a target moving time, t denotes an elapsed time whose initial value is 0, $V_0$ denotes a constant, a power j is set at 3 of larger and a power k is set at 2 or larger.

Further preferably, in the positioning control system, the position of the controlled device is detected by the position detecting means, an estimated speed of the controlled device is calculated in accordance with a detected position information for each sample and a driving amount of drive means which moves the controlled device and the follow control means controls the drive means so that a difference between the estimated speed and a target speed according to the target trajectory becomes zero.

Further preferably, in the positioning control system, the position of the controlled device is detected by the position detecting means, an estimated speed of the controlled device is calculated in accordance with a detected position information for each sample and a driving amount of drive means which moves the controlled device, and a speed feedback gain corresponding to the estimated speed is set.

Further preferably, the positioning control system further comprises position correcting means which stores a position correction value that is calculated taking into account of displacement of the controlled device in a given position. In this case, the trajectory generating means predicts a position correction value when the movement of the controlled device is completed in accordance with the target moving time, and corrects previously the target trajectory in accordance with the predicted position correction value. Further, the follow control means controls the drive means so that the control device is moved following the target trajectory to be positioned at the designated position.

More concretely, the positioning control system can be applied to a magnetic disk drive including a magnetic head, an optical disk drive including an optical head and a printing device including a print head.

DESCRIPTION OF THE PREFERRED EMBODIMENTS

Figure 6:
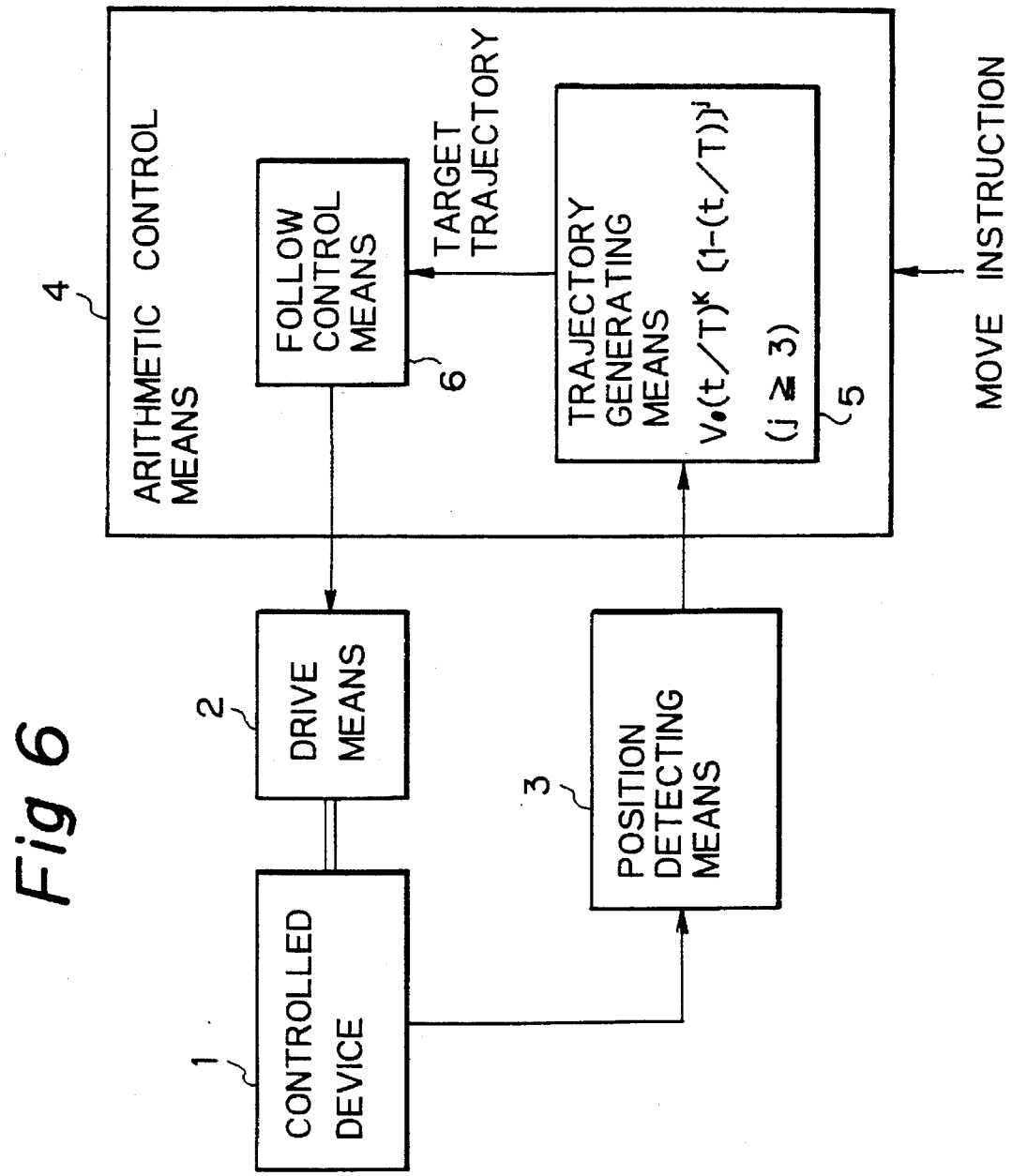
FIG. 6 is a block diagram showing an embodiment based on a first principle of the present invention.

An embodiment of a positioning control system based on a first principle of the present invention will be described with reference to FIG. 6. The positioning control system comprises drive means 2 for moving and positioning a controlled device 1 at a designated position, position detecting means 3 for detecting the position of the controlled device 1, and arithmetic control means 4 for controlling the drive means 2 in accordance with the position of the controlled device 1 detected by the position detecting means 3 and the designated position, wherein the arithmetic control means 4 includes trajectory generating means 5 for calculating a target trajectory in accordance with an entire moving distance between a current position of the controlled device 1 and the designated position, and follow control means 6 for controlling the drive means 2 in accordance with the target trajectory from the trajectory generating means and the position of the controlled device 1 detected by the position detecting means 3 so that the controlled device 1 moves following the target trajectory; the trajectory generating means 5 calculates the target trajectory using an algebraic polynomial representing an acceleration-deceleration pattern which makes a derivative of a target acceleration zero at the designated position where movement of the controlled device 1 is completed; and the follow control means 6 positions the controlled device 1 while causing the same to follow the target trajectory.

The target trajectory is expressed by a polynomial, $V_0 (t/T)^k [1-(t/T)^j]$, where T denotes a target moving time, t denotes an elapsed time whose initial value is 0, $V_0$ denotes a constant, a power j is set at 3 or larger, and a power k is set 2 at 2 or larger.

The position of the controlled device 1 is detected by the position detecting means 3, an estimated speed of the controlled device 1 is calculated in accordance with a detected position information for each sample and a driving amount of the drive means 2 which moves the controlled device 1, and the follow control means 6 controls the drive means 2 so that a difference between the estimated speed and a target speed according to the target trajectory becomes zero.

A moving time of the controlled device 1 between the current position and the designated position is set in proportion to a square root to a cube root of the moving distance.

The position of the controlled device 1 is detected by the position detecting means 3, an estimated speed of the controlled device 1 is calculated in accordance with a detected position information for each sample and a driving amount of the drive means 2 which moves the controlled device 1, and a speed feedback gain corresponding to the estimated speed is set.

A normalized time is calculated based on a detected position information from the position detecting means 3, and a response delay is added to the calculated normalized time so as to compensate for the response delay.

A constant speed period is provided between an acceleration period and a deceleration period which are determined in accordance with the target trajectory when the moving distance of the controlled device 1 is longer than a predetermined value.

The drive means 2 includes a voice coil motor or the like, moves and positions the controlled device 1 such as a head at the designated position. The arithmetic control means 4 includes the trajectory generating means 5 and the follow control means 6. The trajectory generating means 5 calculates a target trajectory in accordance with the entire moving distance between the current position of the controlled device 1 and the designated position. The target trajectory is expressed by such an algebraic polynomial that the derivative of the target acceleration becomes zero at the designated position where the movement of the controlled device 1 is completed. The follow control means 6 positions the controlled device 1 at the designated position by controlling the drive means 2 so that the controlled device 1 is moved following the target trajectory.

The target trajectory is calculated by the trajectory generating means 5 of the arithmetic control means 4, and is expressed by the polynomial, $V_0 (t/T)^k [1-(t/T)^j]$, where T denotes a target moving time, t denotes an elapsed time whose initial value is 0, and $V_0$ denotes a constant. By setting the power j at 3 or larger, the derivative of the target acceleration when the controlled device 1 is moved to the designated position becomes zero. Further, if the power k is set equal to the power j, patterns of the target acceleration during the acceleration period and the deceleration period become symmetrical.

Further, the follow control means 6 calculates an estimated speed of the controlled device 1 in accordance with the detected position information for each sample and the driving amount of the drive means 2, and controls the drive means 2 so that the difference between the estimated speed and a target speed according to the target trajectory becomes zero. In this way, the follow control means 6 causes the moving speed of the controlled device 1 to follow the target speed.

The trajectory generating means 5 makes a target moving time T of the controlled device 1 between the current position and the designated position longer according to the moving distance. However, a ratio of the target moving time T to the moving distance is not 1, rather the target moving time T is set in proportion to a square root to a cube root of the moving distance.

The position detecting means 3 detects the position of the controlled device 1, and estimates the moving speed of the controlled device 1 in accordance with the detected position information for each sample used in a digital computation and the driving amount of the drive means 2 which moves the controlled device 1. The position detecting means 3 set the speed feedback gain corresponding to the estimated speed.

Although the controlled device 1 is moved by the drive means 2, actual movement of the controlled device 1 is liable to be delayed relative to the target trajectory due to delays in the respective components. In view of this, a response delay time is added to the normalized time so as to compensate for the response delay.

There occurs a case where the moving speed becomes in excess of an upper limit speed when the moving distance of the controlled device 1 is long. Accordingly, the constant speed period is provided between the acceleration period and the deceleration period, and the control system proceeds to the constant speed period when the target speed reaches the upper limit value.

Figure 7:
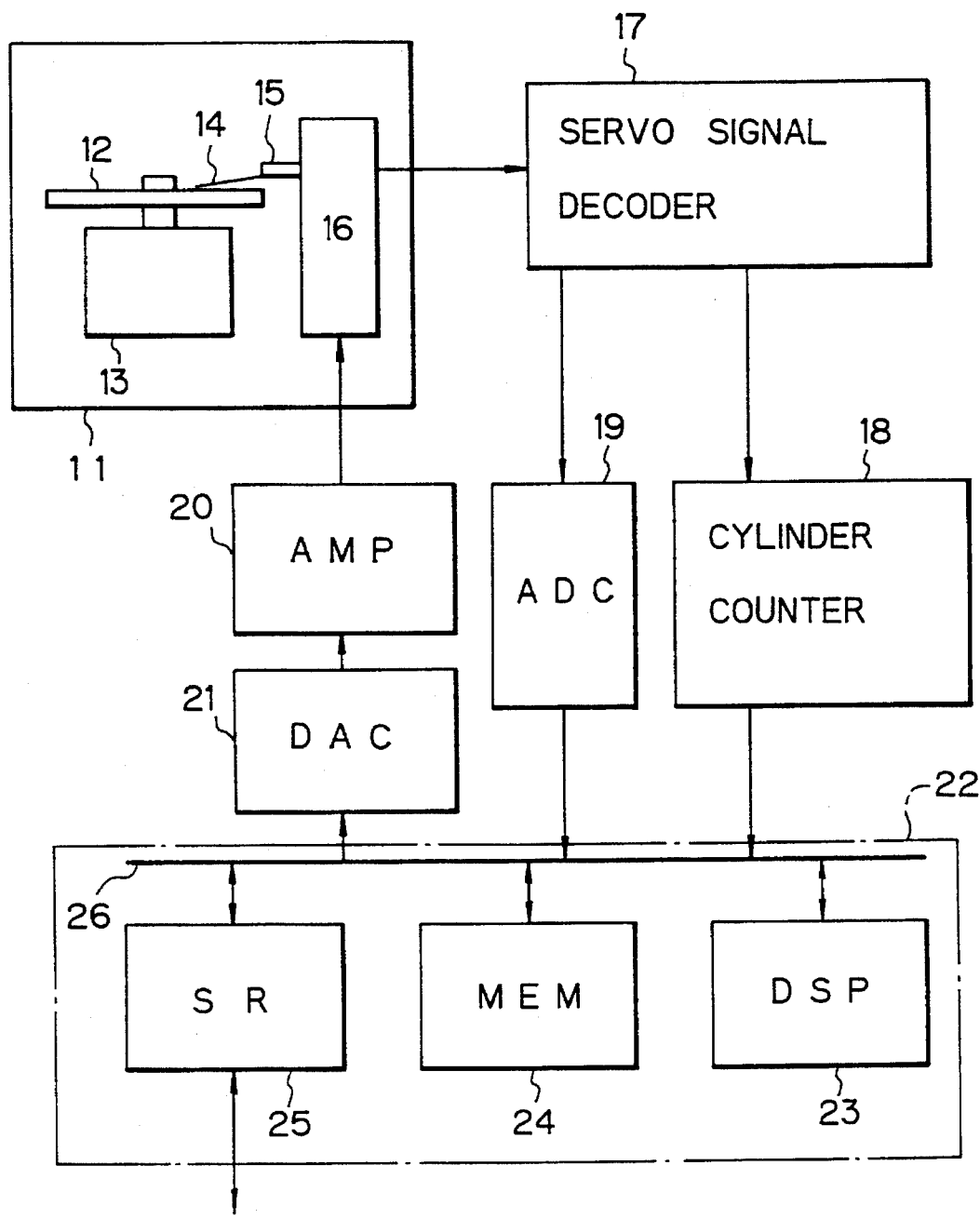
FIG. 7 is a block diagram showing one exemplary embodiment according to the present invention.

FIG. 7 is a block diagram showing one exemplary embodiment of the present invention, wherein the invention is applied to a magnetic disk device. In this figure, the reference numeral 11 denotes a magnetic disk drive, 12 a magnetic disk, 13 a spindle motor, 14 a head, 15 a head arm, 16 an actuator including a voice coil motor, and 17 a servo signal decoder, 18 a cylinder counter, 19 an AD converter (ADC), 20 an amplifier (AMP), 21 a DA converter (DAC), 22 an arithmetic controller, 23 a digital signal processor (DSP), 24 a memory (MEM), 25 a transfer register for transferring data to and from a host device, and 26 a bus. A construction for controlling data reading and writing operations by means of the head 14 is unillustrated.

The magnetic disk drive 11 includes the magnetic disk 12 which is rotated at a given speed by the spindle motor 13 and the actuator 16 which is controlled so as to position the head 14 at the designated track position of the magnetic disk 12 by moving the head arm 15 having the head 14 supported at a leading end thereof. A variety of known constructions can be applied to the magnetic disk drive 11. The head 14 corresponds to the controlled device 1 in FIG. 6 and the actuator 16 corresponds to the drive means 2 in FIG. 6.

Figure 1A:
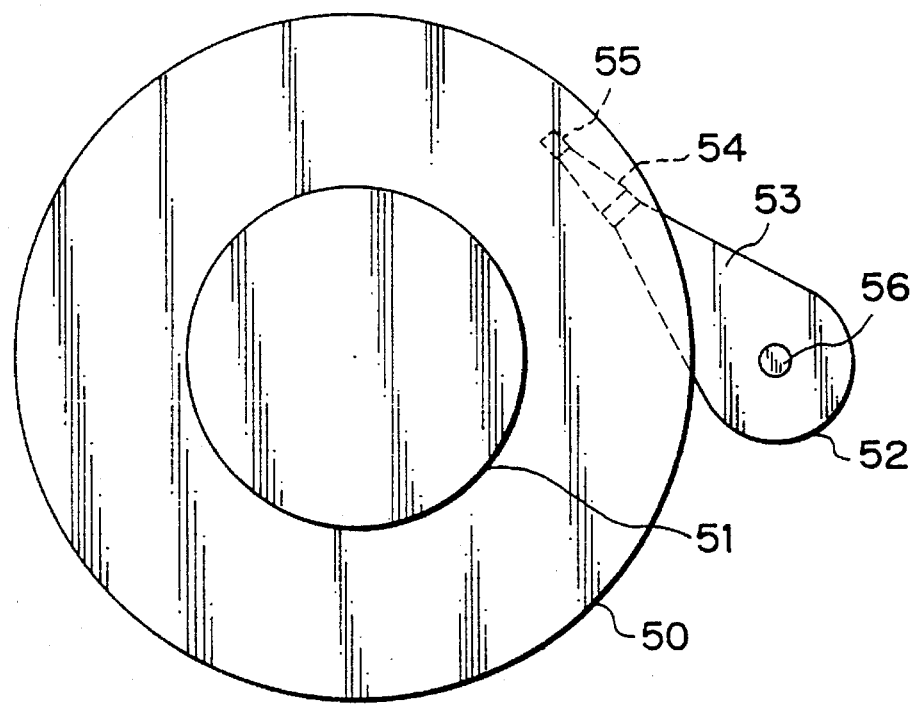
FIGS. 1(A) and 1(B) are diagrams each wing a magnetic disk drive.
Figure 1B:
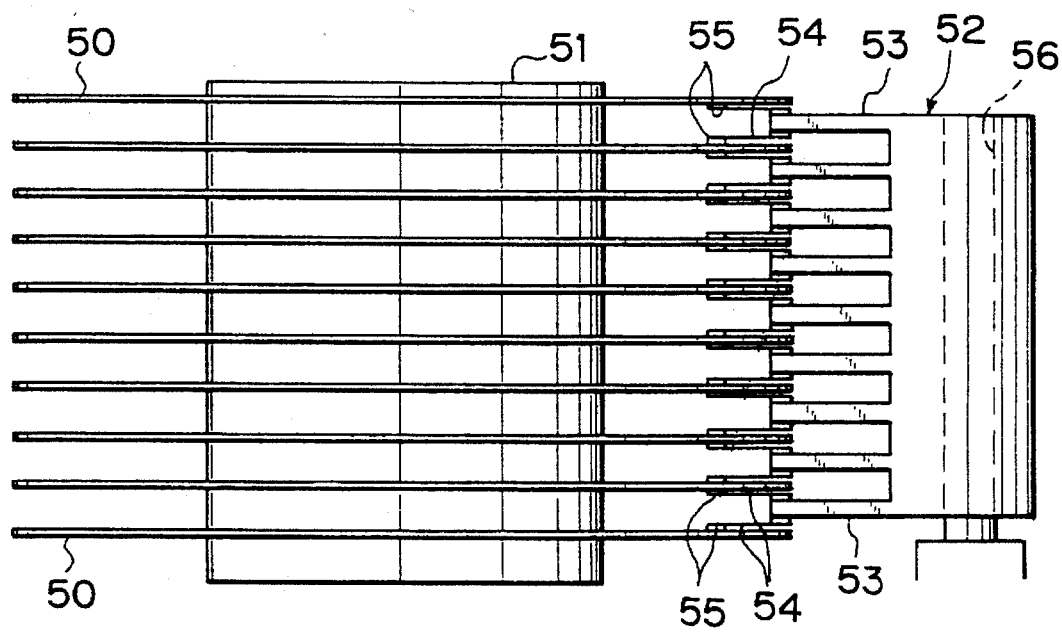

The servo signal decoder 17 decodes a servo signal read from the magnetic disk 12 through the head 14. The cylinder counter 18 counts the number of zero crossings or the like as a cylinder number (track number), and indicates the current position of the head 14 from a reference point by the cylinder number (track number). Accordingly, the moving distance (seek distance) of the head 14 corresponds to the number of tracks between the current track position and the designated track position. The AD converter 19 converts the decoded two-phase servo signal into a digital signal. A combination of the cylinder counter 18 and the AD converter 19 detects the current position of the head 14 from the reference point, and corresponds to the position detecting means 3 in FIG. 1. The DA converter 21 converts a drive control signal sent through the bus 26 from the digital signal processor 23 into an analog signal, which is amplified by the amplifier 20 to drive the actuator 16.

The arithmetic controller 22 includes the digital signal processor 23, the memory 24, and the transfer register 25. In accordance with an address signal or the like from the host device, the digital signal processor 23 calculates the moving distance of the head 14 between the current position and the designated position, calculates the target trajectories corresponding to the calculated moving distance, and controls the actuator 16 so that the head 14 follows the calculated target trajectories. In other words, the digital signal processor 23 corresponds to the arithmetic control means 4 in FIG. 6. The trajectory generating means 6 and the follow control means 7 in FIG. 6 are realized by an arithmetic control function of the digital signal processor 23.

The invention is made on the condition that: (a) a derivative $da_{obj}/dt$ of the target acceleration at $t=T$, i.e. when the movement of the head 14 as the controlled device 1 is completed, is continuous; (b) the derivative $da_{obj}/dt$ of the target acceleration is at minimum at $t=T-\epsilon$ ($\epsilon$=control error time); and (c) the target trajectories are represented as simplest possible functions so as to be calculated at a high speed by means of the digital operation. The speed trajectory satisfying the above conditions (a) to (c) is represented in the following equation:

$$v_{obj}/(L/T)=V_0 t_n^k (1-t_n)^j \qquad (7)$$

wherein $V_0$ denotes a constant, k denotes an integer not smaller than 2, and j denotes an integer not smaller than 3.

It is seen that $da_{obj}/dt=(d/dt)^2 \cdot v_{obj}$ is zero at $t=T$ since the equation (7) has three or more roots at $t_n=1$, i.e. $t=T$. The constant $V_0$ in the equation (7) is determined by boundary conditions, namely $L=x_{obj}(T)=\int(0-T)v_{obj}(t)dt$ (where $\int(0-T)$ is an integration on an interval between 0 and T) and $x_{obj}(0)=0$. $V_0=(k+j+1)!/(k!\cdot j!)$ where ! is a factorial mark.

For instance, if it is assumed that k=2, j=3 regarding the powers k, j, the target trajectories of position, speed, and acceleration are represented as follows:

$$x_{obj}/L=t_n^3 (20-45t_n+36t_n^2-10t_n^3) \qquad (8)$$

$$v_{obj}/(L/T)=60t_n^2(1-t_n)^3 \qquad (9)$$

$$a_{obj}/(L/T^2)=300t_n (1-t_n)^2 (0.4-t_n) \qquad (10)$$

Further, if it is assumed that k=3, j=3, the target trajectories of position, speed and acceleration are represented as follows:

$$x_{obj}/L=t_n^4 (35-84t_n+70t_n^2-20t_n^3) \qquad (11)$$

$$v_{obj}/(L/T)=140t_n^3 (1-t_n)^3 \qquad (12)$$

$$a_{obj}/(L/T^2)=840t_n^2 (1-t_n)^2 (0.5-t_n) \qquad (13)$$

Figure 8:
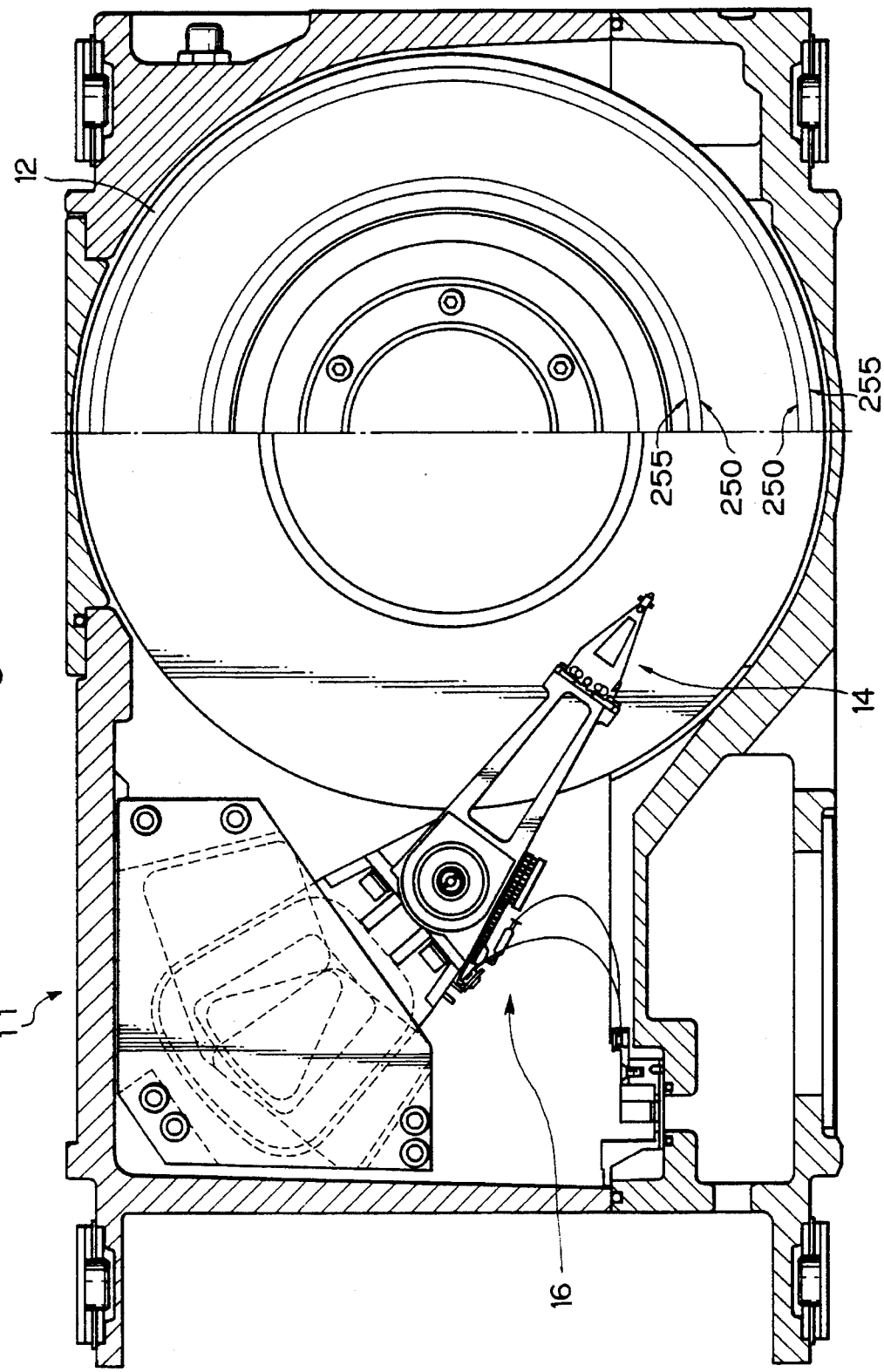
FIG. 8 is a partially sectional plan view showing a mechanism of a magnetic disk drive.

Further, in order to facilitate understanding of the embodiment according to the present invention, a partially sectional plan view showing a mechanism of a magnetic disk drive is illustrated in FIG. 8. In this case, as seen from FIG. 8 and FIG. 1, a plurality of disks 12 rotated simultaneously. The tracks on a recording surface of each disk 12 are written with a predetermined data pattern. However, the tracks at both ends of the inner zone and the outer zone of each disk 12 are formed as guard bands 250 in which a particular pattern is written, instead of a data pattern, which particular pattern is used for stopping a seek operation of the head 14. Further, at the inner and the outer sides of the guard band 250, an earase noze 255 is formed for mechanically stopping the head 14.

Figure 9:
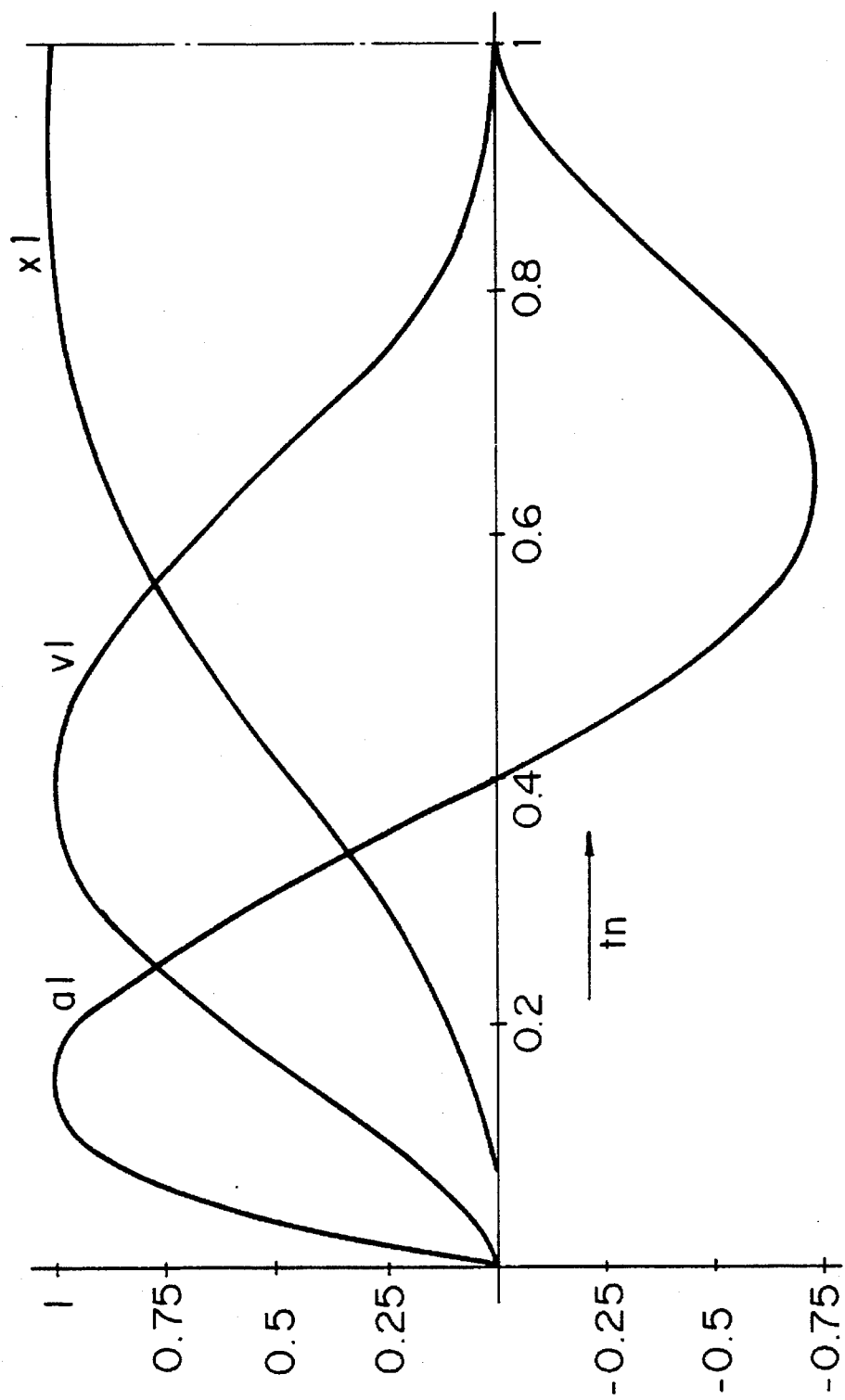
FIG. 9 is a graph showing target trajectories of one embodiment.

FIG. 9 is a graph showing the target trajectories of one embodiment of the present invention. A horizontal axis represents a normalized time $t_n=t/T$, and a vertical axis represents normalized position, speed, and acceleration. The target position $x_{obj}$, the target speed $v_{obj}$, and the target acceleration $a_{obj}$ in accordance with the equations (8) to (10) are indicated by curves x1, v1, and a1 respectively. The target acceleration $a_{obj}$ becomes zero at the normalized time $t_n=t/T=0.4$, a period before this is an acceleration mode while a period thereafter is a deceleration mode. The target acceleration $a_{obj}$ approximates to zero in the vicinity of the point where the normalized time $t_n=t/T=1$, and a derivative thereof becomes zero at the normalized time $t_n=t/T=1$.

Figure 10:
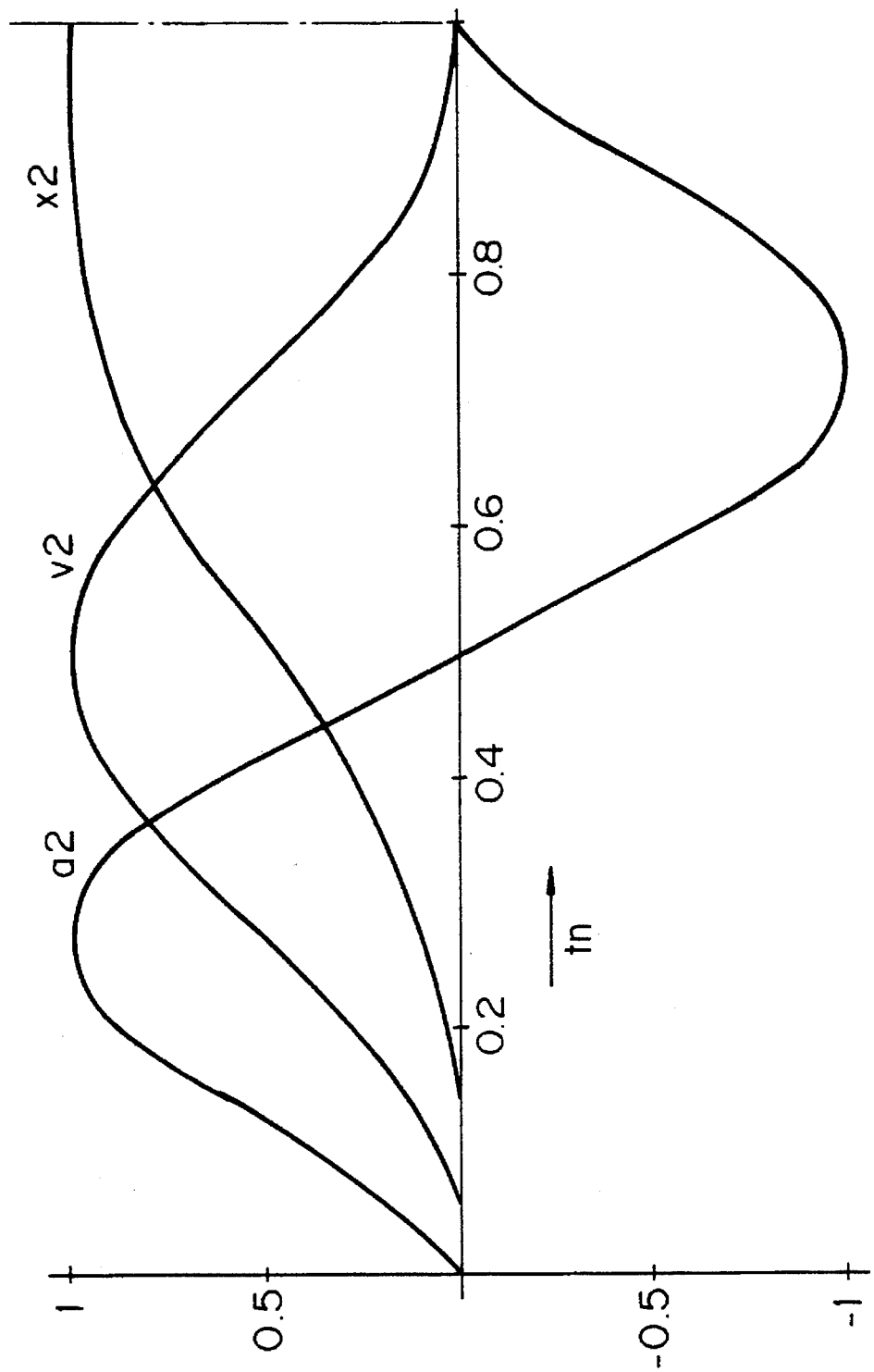
FIG. 10 is a graph showing target trajectories of one embodiment.

FIG. 10 is a graph showing the target trajectories of the present embodiment. The target position $x_{obj}$, the target speed $v_{obj}$, and the target acceleration $a_{obj}$ in accordance with the equations (11) to (13) are indicated by curves x2, v2, and a2 as in FIG. 10. The target acceleration $a_{obj}$ becomes zero at the normalized time $t_n=t/T=0.5$, and accordingly the acceleration mode and the deceleration mode is symmetrical in this case. Compared to the case where k=2, j=3, the case where k=3, j=3 presents the reduced target acceleration during the acceleration, and is thus advantageous in making an accelerating current smaller under a given supply voltage.

Figure 2:
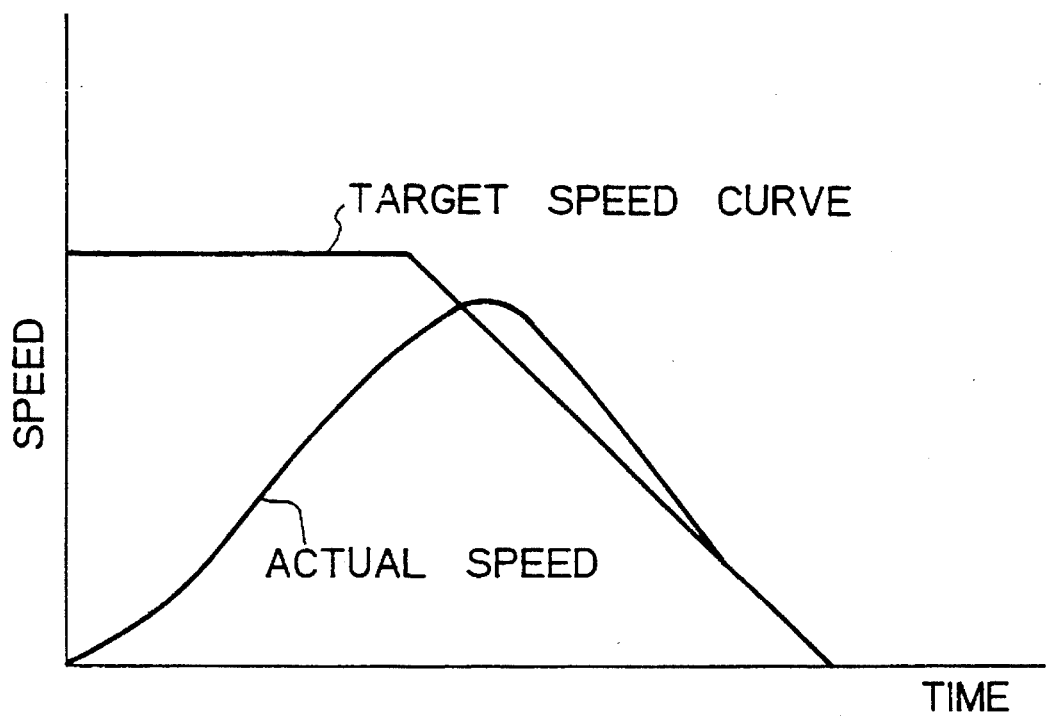
FIG. 2 is a graph showing a control characteristic of a prior art.
Figure 11:
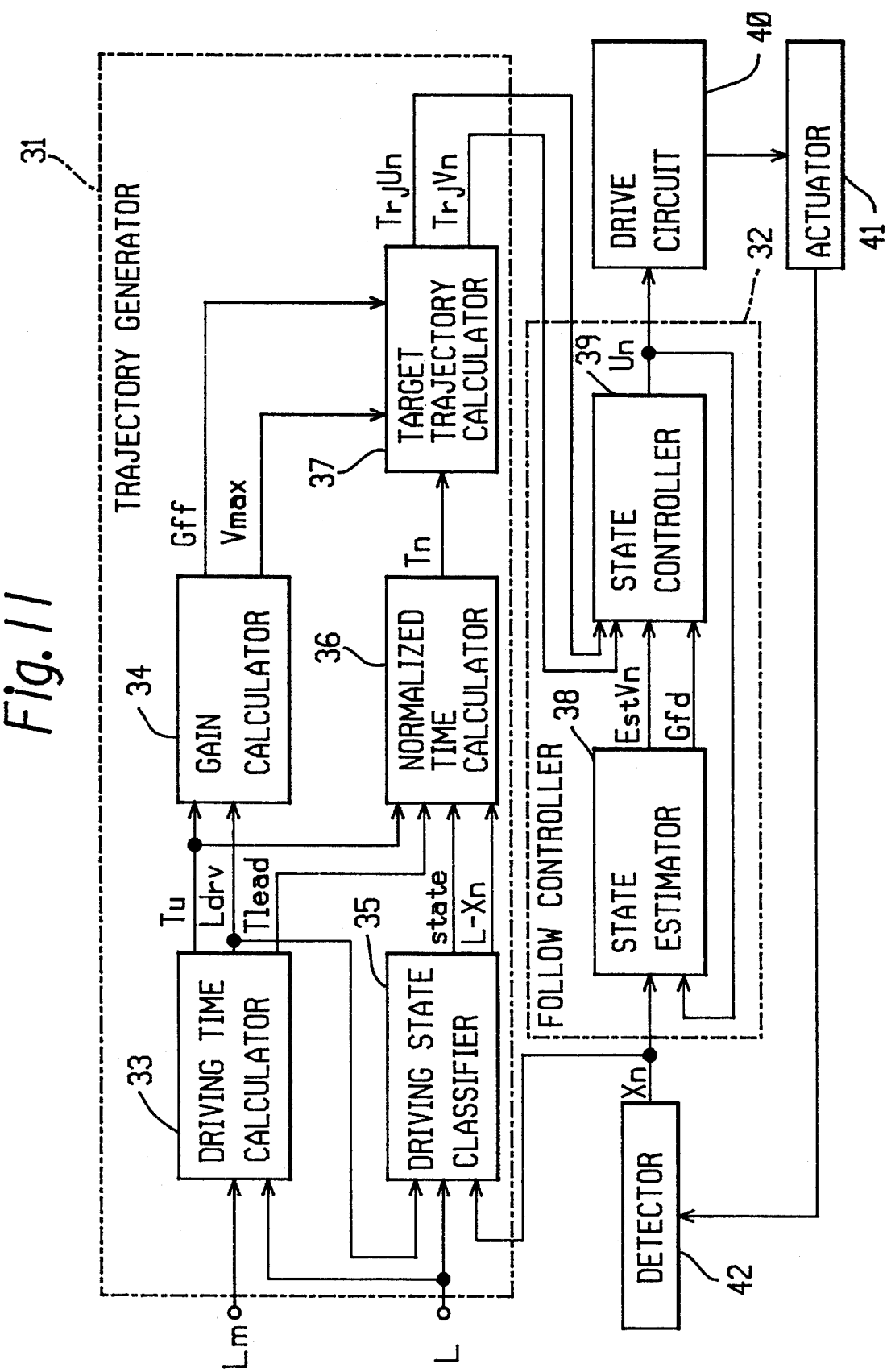
FIG. 11 is a function block diagram showing arithmetic control means of the embodiment.

FIG. 11 is a function block diagram of the arithmetic controller of the present embodiment. Indicated at L is a moving distance of the head 14, and at Lm is a maximum moving distance not requiring a constant speed control. In other words, the constant speed mode is put between the acceleration mode and the deceleration mode in the case where the head 14 is moved a distance longer than Lm. The reference numeral 31 denotes a trajectory generator, 32 a follow controller, 33 a driving time calculator, 34 a gain calculator, 35 a driving state classifier, 36 normalized time calculator, 37 a target trajectory calculator, 38 a state estimator, 39 a state controller, 40 a drive circuit, 41 an actuator, and 42 a detector. The actuator 41 corresponds to the actuator 16 in FIG. 2, and the detector 42 detects the position of the head arm (see 15 in FIG. 7) moved by the actuator 41, i.e. the current position of the head. The function of the respective components can be realized by the arithmetic control function of the digital signal processor.

Figure 5:
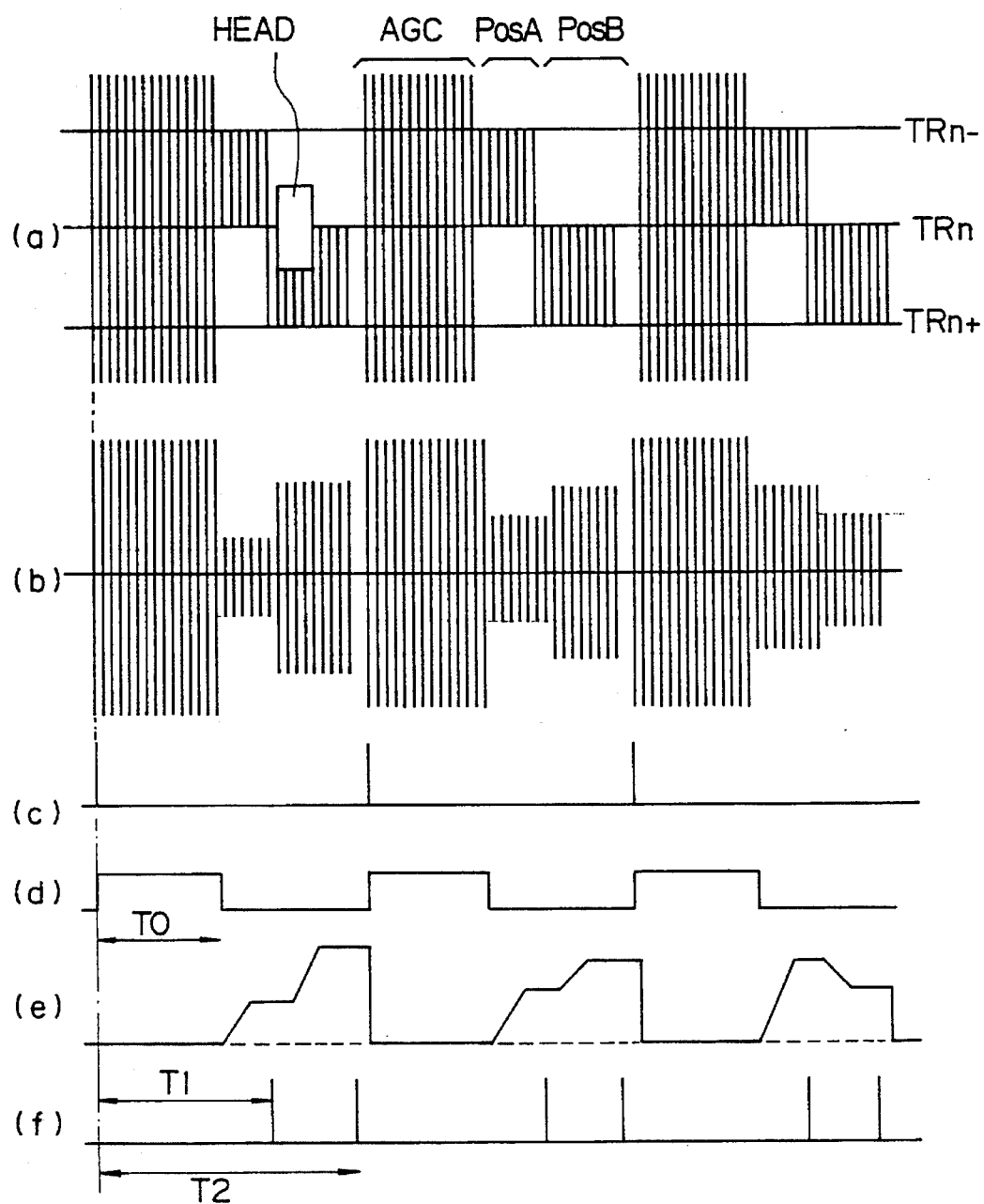
FIG. 5 is a diagram showing servo signals stored on a data surface.
Figure 12:
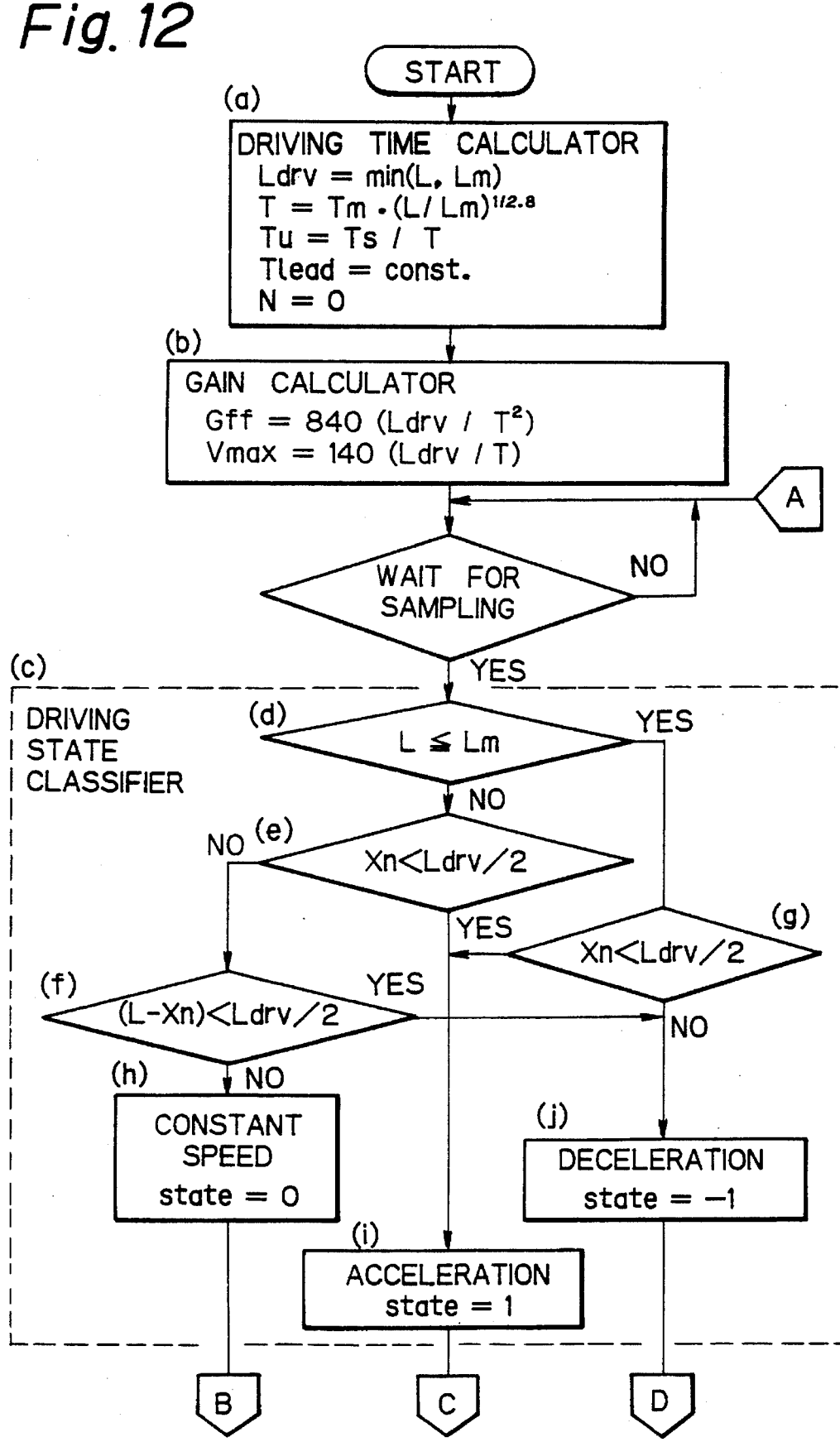
FIG. 12 is a flow chart showing an operation of one embodiment.
Figure 13:
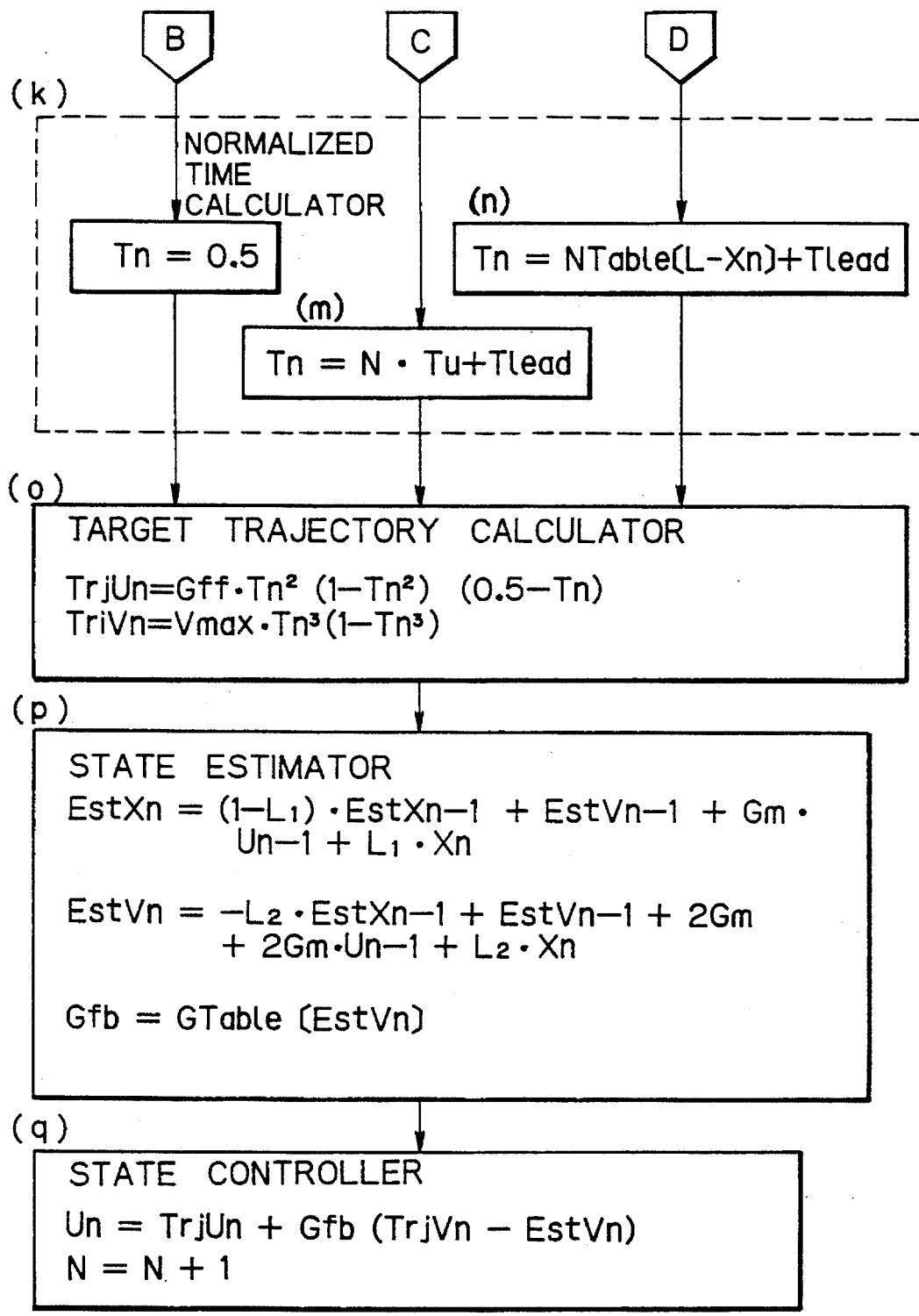
FIG. 13 is a flow chart showing an operation of one embodiment.

FIGS. 12 and 13 are flow charts showing an operation of the arithmetic controller of the present embodiment. Operations of the respective components will be described by means of Steps (a) to (q) with reference to FIG. 5. To the trajectory generator 31 are input the moving distance L between the current position and the designated position, the predetermined constant speed mode starting distance Lm, and the position detected by the detector 42.

Step (a): The driving time calculator 33 calculates an acceleration/deceleration distance Ldrv, a target moving time T, a normalized sampling time Tu, and a lead compensation time Tlead for compensating for a control delay in accordance with the moving distance L and the constant speed mode starting distance Lm.

$$Ldrv = \min(L, Lm) \tag{14}$$

$$T = Tm\,(L/Lm)^i \tag{15}$$

$$Tu = Ts/T \tag{16}$$

$$Tlead = \text{const.} \tag{17}$$

The equation (14) indicates that the smaller one of the moving distance L and the constant speed mode starting distance Lm is selected as the acceleration/deceleration distance Ldrv. The equation (15) indicates that the target moving time T is a value proportional to $(L/Lm)^i$, the power i can be any value between 1/2 and 1/3. For example, the power i may be 1/2.8. The normalized sampling time Tu in the equation (16) is represented as a ratio of a sampling time to the target moving time T. The lead compensation time Tlead in the equation (17) is adapted to compensate for the control delays in the respective components so as to make a deviation from the target trajectory smaller. The equation (17) shows a case where the lead compensation time Tlead is a constant value (const.). For example, Tlead may be equal to 2 Tu. Alternatively, Tlead may be made variable if necessary. A sampling counter N is initialized, and has a value thereof set at 0.

Step (b): The gain calculator 34 calculates a feedforward gain Gff and a maximum speed Vmax based on the normalized sampling time Tu and the acceleration/deceleration distance Ldrv input thereto as follows:

$$Gff = 840\,(Ldrv/T^2) \tag{18}$$

$$Vmax = 140\,(Ldrv/T) \tag{19}$$

Step (c): The driving state classifier 35 receives the acceleration/deceleration distance Ldrv, the moving distance L, and the detected position Xn from the detector 42, and carries out a processing in Step (c) of the flow chart shown in FIG. 12. It is understood that the detected position Xn is expressed in the form of the distance from the original position. The classifier 35 repeats calculations of (d) to (q) based on the detected position Xn obtained in each sampling time. First of all, it is discriminated whether L≦Lm in (d). If L≦Lm, i.e. the constant speed mode is not included because the moving distance L is shorter than the constant speed mode starting distance Lm, it is discriminated whether Xn <(Ldrv/2) in Step (g). If Xn <(Ldrv/2), i.e. the detected position Xn is shorter than half the acceleration/deceleration distance Ldrv, an accelerating state is determined (state =1) in Step (i). In this case, the target acceleration becomes zero at one half of the normalized time $t_n$ as shown in FIG. 10. Thus, it is discriminated whether the detected position Xn has become in excess of the acceleration/deceleration distance Ldrv.

If Xn<(Ldrv/2) in Step (g), a decelerating state is determined (state=1) in Step (j). If L>Lm, i.e. the constant speed mode is put between the acceleration mode and the deceleration mode because the moving distance L is longer than the constant speed mode starting distance Lm, in Step (d), it is discriminated whether Xn<(Ldrv/2) in Step (e). If Xn<(Ldrv/2), the accelerating state (state =1) is determined in Step (i). If Xn ≧(Ldrv/2) in Step (e), it is discriminated whether (L–Xn)<(Ldrv/2) in Step (f). If (L–Xn)<(Ldrv/2), the decelerating state (state=–1) is determined in Step (j). If (L–Xn)≧(Ldrv/2), the constant speed state (state =0) is determined in Step (h). The remaining moving distance is given by an expression (L–Xn).

Step (k): The normalized time calculator 36 carries out a processing of calculating the normalized time Tn in Step (k) of FIG. 13. To the normalized time calculator 36 are input the normalized sampling time Tu, the control state, the remaining moving distance (L–Xn), and the lead compensation time Tlead from the driving time calculator 33. At the time of the accelerating state (state=1), the normalized time Tn is calculated as follows in Step (m): Tn=N·Tu+Tlead. In this case, N indicates n-th sampling from the start of the trajectory calculation. At the time of the constant speed state (state=0), the normalized time Tn is set at 0.5 in Step (1). At the time of the decelerating state (state=–1), the normalized time Tn is calculated as follows: Tn=NTable[L–Xn]+Tlead. NTable [L–Xn] is a table of values solved for x in an equation with respect to the normalized target position y: $y = x^4\,(35 - 84x + 70x^2 - 20x^3)$ (same as the equation (11)). With the use of this table, the normalized time can be obtained from the actually measured position. For example, the table may store values of x as related to values of y=0.5 to 1.0.

Step (o): The target trajectory calculator 37 carries out a processing of Step (o) in FIG. 13. When the feedforward gain Gff and the maximum moving speed Vmax from the gain calculator 34 and the normalized time Tn from the normalized time calculator 36 are input, the target trajectory calculator 37 calculates a feedforward current TrjUn and a target speed TrjVn using the following equations (20), (21).

$$TrjUn = Gff \cdot Tn^2\,(1-Tn^2)\,(0.5-Tn) \tag{20}$$

$$TrjVn = Vmax \cdot Tn^3\,(1-Tn^3) \tag{21}$$

The calculated feedforward current TrjUn and the target speed TrjVn are input to the state controller 39 provided in the follow controller 32.

Step (p): The state estimator 38 provided in the follow controller 32 carries out a processing of Step (p) in FIG. 13. When the detected position Xn from the detector 42 and the drive current Un from the state controller 39 are input, the estimator 38 calculates an estimated speed EstVn using the following equations (22) to (24).

$$EstXn = (1-L_1)\,EstXn-1 + EstVn-1 + GmUn-1 + L_1 \cdot Xn \tag{22}$$

$$EstVn = -L_2 \cdot EstXn-1 + EstVn-1 + 2Gm \cdot Un-1 + L_2 \cdot Xn \tag{23}$$

$$Gfb = GTable\,[EstVn] \tag{24}$$

wherein a constant Gm is expressed as follows:

$$Gm = (Kf \cdot Ts^2 \cdot Gdrv \cdot Gsns)/(2M \cdot Ltp).$$

Here, Gdrv denotes a gain of the drive circuit 40, Gsns denotes a gain of the detector 42, and Ltp denotes a track pitch. Further, indicated at $L_1$, $L_2$ are constants for determining the characteristic of the state estimator (observer). These constants are determined using a design method of the state estimator. This design method is explained in detail, for example, in "Digital Control of Dynamic Systems," by G. F. Franklin, J. D. Powell and M. L. Workman (Addision-Wesley Publishing Company, Second Edition). The equation (24) indicates that the feedback gain Gfb is read from a table GTable [EstVn] storing the feedback gains Gfb in accordance with the estimated speed EstVn.

Step (q): The state controller 39 carries out a processing of Step (q) in FIG. 10. When the feedforward current TrjUn, the target speed TrjVn, the estimated speed EstVn, and the feedback gain Gfb are input, the state controller 39 calculates a drive current Un in accordance with the following equation (25).

$$U_n = TrjU_n + Gfb \cdot (TrjV_n - EstV_n) \quad (25)$$

By applying the drive current Un to the actuator 41 through the drive circuit 40, the head can be moved following the target trajectories and can be controllably positioned at the designated position stably, and the sampling counter N is incremented.

Figure 3:
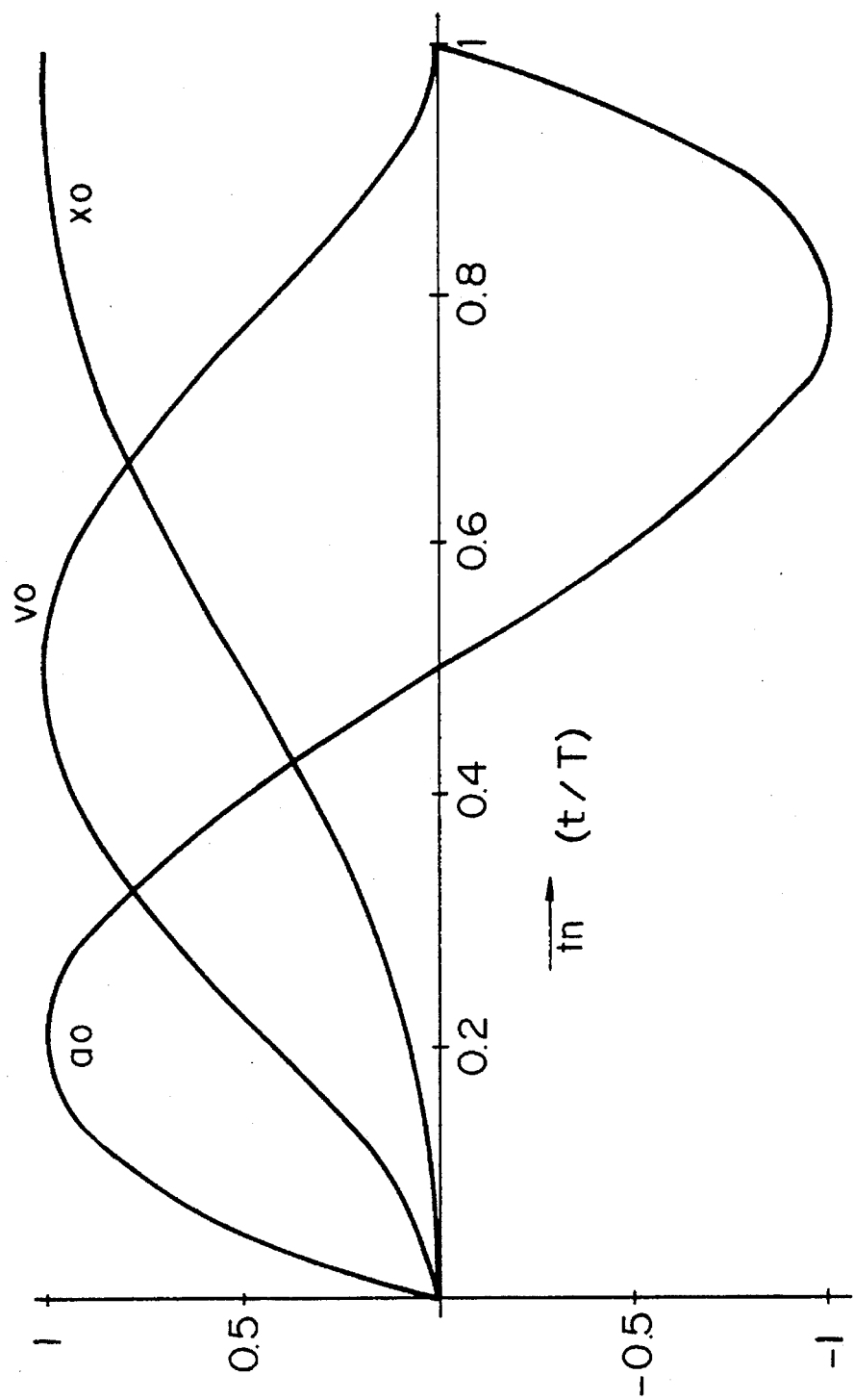
FIG. 3 is a graph showing target trajectories of a prior art.
Figure 4:
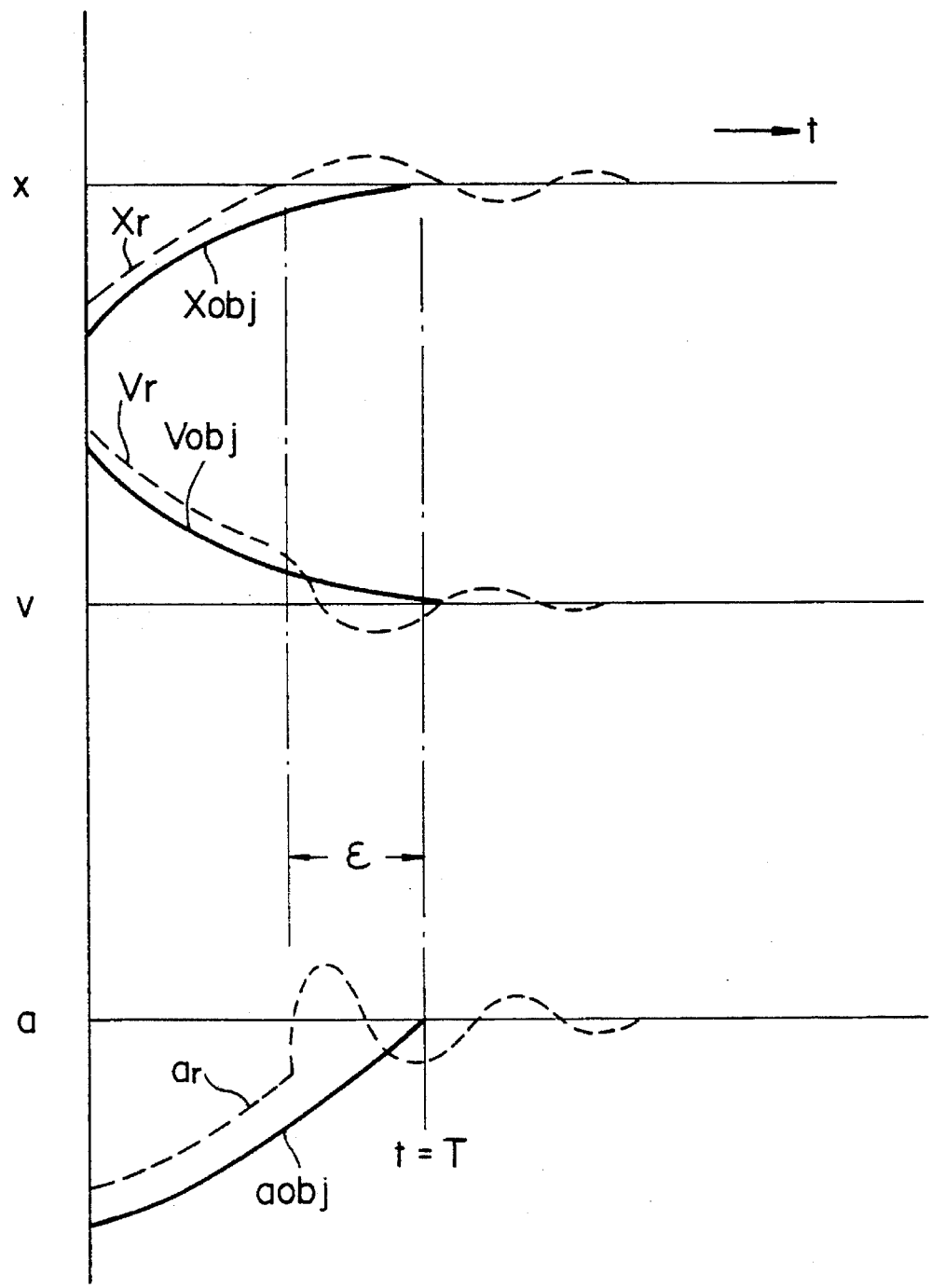
FIG. 4 is a graph showing the target trajectories and actual trajectories.
Figure 14:
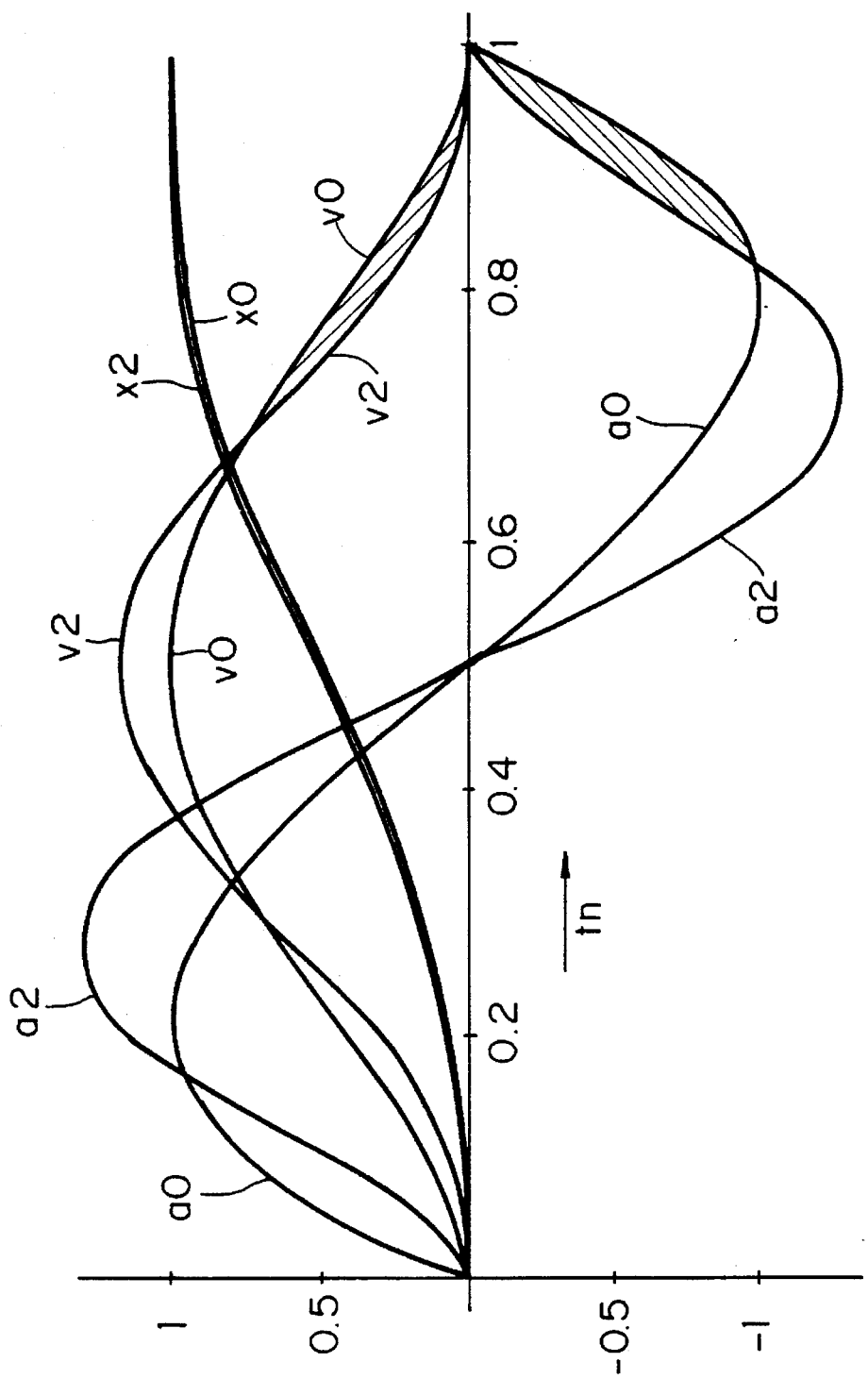
FIG. 14 is a graph showing a comparison between a previously proposed positioning control and a positioning control of one embodiment.

FIG. 14 is a graph in which curves of FIGS. 10 and 3 are shown in an overlapping manner. The target position, the target speed, and the target acceleration in the previously proposed positioning control system are indicated by curves x0, v0, and a0, whereas those according to the present embodiment are indicated by curves x2, v2, and a2. In regard to the respective normalized trajectories of position, speed and acceleration, the target acceleration according to the present embodiment is lower than the one according to the previously proposed positioning control system on an interval, t=(0.8 to 1.0)T, by an amount as indicated by oblique lines. It is also seen that $da_{obj}/dt=0$ at t=T. Accordingly, by executing the positioning control using these target trajectories, the control system becomes unaffected by variations of the parameters thereof and the disturbances, and is thus capable of avoiding transitive vibrations as shown in FIG. 4 which are found in the prior art.

The target speed according to the present embodiment is lower than the one according to the previously proposed positioning control system on an interval, t=(0.7 to 1.0)T, by an amount as indicated by oblique lines, thereby enabling the feedback gain to be made larger rapidly. Accordingly, a deviation permissible range in following the trajectory can be made larger and a deviation at t=T can be minimized. This enables the head to be positioned at the designated position at a higher speed and stably. Since the positioning is controlled so as to follow the target speed $TrjV_n$ as shown in the equation (25), the deviation $(TrjV_n - EstV_n)$ becomes smaller in the vicinity of a deceleration completion zone where both the target speed $TrjV_n$ and the estimated speed $EstV_n$ becomes smaller. In view of this, it is effective to increase the feedback gain and to suppress the control error to a low level at the time of deceleration in order to enhance the relative degree of following of the estimated speed $EstV_n$ and the target speed $TrjV_n$. Thus, the feedback gain is increased as the estimated speed $EstV_n$ becomes smaller with the use of the table indicated in the equation (24). This table GTable is optimized experimentally, but is normally designed such that the gains obtained when the deceleration is nearly completed are two to three times as much as those obtained when the head is moved at the high speed.

The gains of the target trajectories are determined depending upon what a value the target moving time T is set at in the equations (11) to (13). If the target moving time T is set at a smaller value, the trajectories obtained in accordance with the equations (12) and (13) correspond to the cases where the curves shown in FIG. 3 or 4 are enlarged in similar figures. On the other hand, the target moving time T is restricted by capability of the amplifier 20 for supplying the drive current to the actuator 16, etc. There is a limit in making the target moving time T shorter since a rate of change of the current is limited due to the inductance of the coil for driving the actuator, or the like. Generally in calculating the trajectories, it is preferable to normalize terms of an algebraic function (within a range of ±1.0) when the digital signal processor is used which carries out a fixed point computation, and the normalized function is multiplied by the gain.

For instance, the equations (12) and (13) may be rewritten into the following equations.

$$v_{obj} = V\max [64 t_n^3 (1-t_n^3)] \quad (26)$$

$$a_{obj} = A\max [50 \times 5^{1/2} \times t_n^2 (1-t_n) (0.5-t_n)] \quad (27)$$

wherein:

$$V\max = (35/16) \ (L/T) \quad (28)$$

$$A\max = (84/125^{1/2}) \ (L/T^2) \quad (29)$$

Thus, the algebraic functions of the equations (26), (27) written in square brackets are normalized, and Vmax and Amax are target trajectory gains.

As will be seen from the equations (26), (27), as the target moving time T is made smaller, the acceleration is increased inversely as the square of the target moving time. However, there exists in fact a maximum current value Imax suppliable from the drive circuit 40 to the actuator 41 as described above. Thus, the target moving time T is set lest Amax should become in excess of $(Kf \cdot Imax)/M$.

If $A\max = (Kf \cdot Imax)/M$, the target moving time T is determined as follows.

$$T = [(84 \ M \cdot L)/(125^{1/2} \cdot Kf \cdot Imax)]^{1/2} \quad (30)$$

In other words, the target moving time T is in proportion to a square root of the moving distance L.

Factors to restrict the gains include the inductance Le of the actuator. If it is assumed that the supply voltage is E, the target moving time T is selected so as to satisfy the following condition:

$$di/dt < E/L \quad (31)$$

In this case, since $i=(M/Kf)a$, the equation (28) can be rewritten as follows.

$$da_{obj}/dt = (105/2) \ (L/T^3) \times [16 t_n (1-t_n) (-1+5t_n-5t_n^2)] \quad (32)$$

In this way, $ad_{obj}/dt$ can be separated into the normalized function and the gain. Thus, the target moving time T can be calculated using the following expression.

$$(105/2) \ (L/T^3) \ (M/Kf) < (E/Le) \quad (33)$$

In this case, the determined target moving time T is in proportion to a cube root of the moving distance L.

When the moving distance L is changed in a wide range:

(α) the target moving time T is determined so as to be proportional to $L^{1/3}$ since the trajectory gains are restricted by the electric inductance of the actuator when the moving distance L is short;

(β) the target moving time T is determined so as to be proportional to $L^{1/2}$ since the trajectory gains are restricted by the maximum value of current supplied to the actuator when the moving distance L is long; and (β) the gains are generally set so as to lie in a range between the cube root and the square root of the moving distance L.

Figure 15:
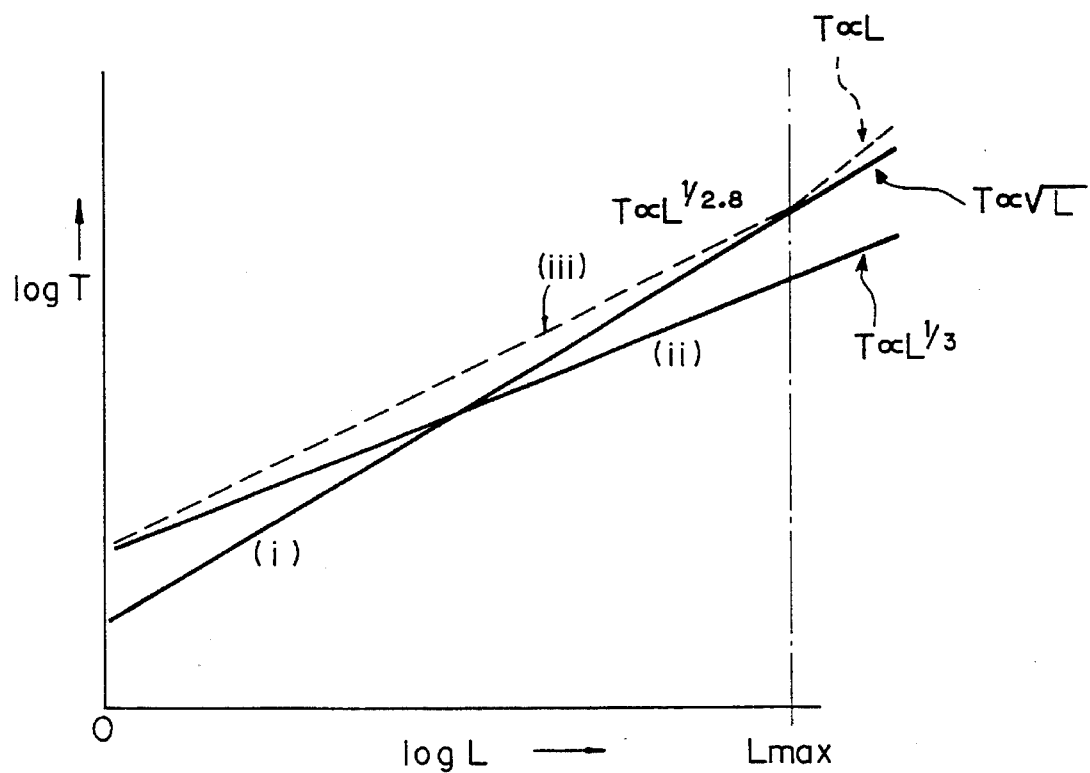
FIG. 15 is a graph showing a relationship between a moving distance and a target moving time of one embodiment.

FIG. 15 is a graph showing a relationship between the moving distance L and the target moving time T, wherein horizontal and vertical axes are scaled logarithmically. A region above solid lines (i), (ii) representing the square root and the cube root of the moving distance L is a permissible selection region of the target moving time T. In consideration of the solid lines (i), (ii), an arrangement is made such that the target moving time T is easily obtained from the moving distance L using a dotted line (iii). In this case, the dotted line (iii) may be representative of, for example, $T=L^{1/2.8}$.

Figure 16:
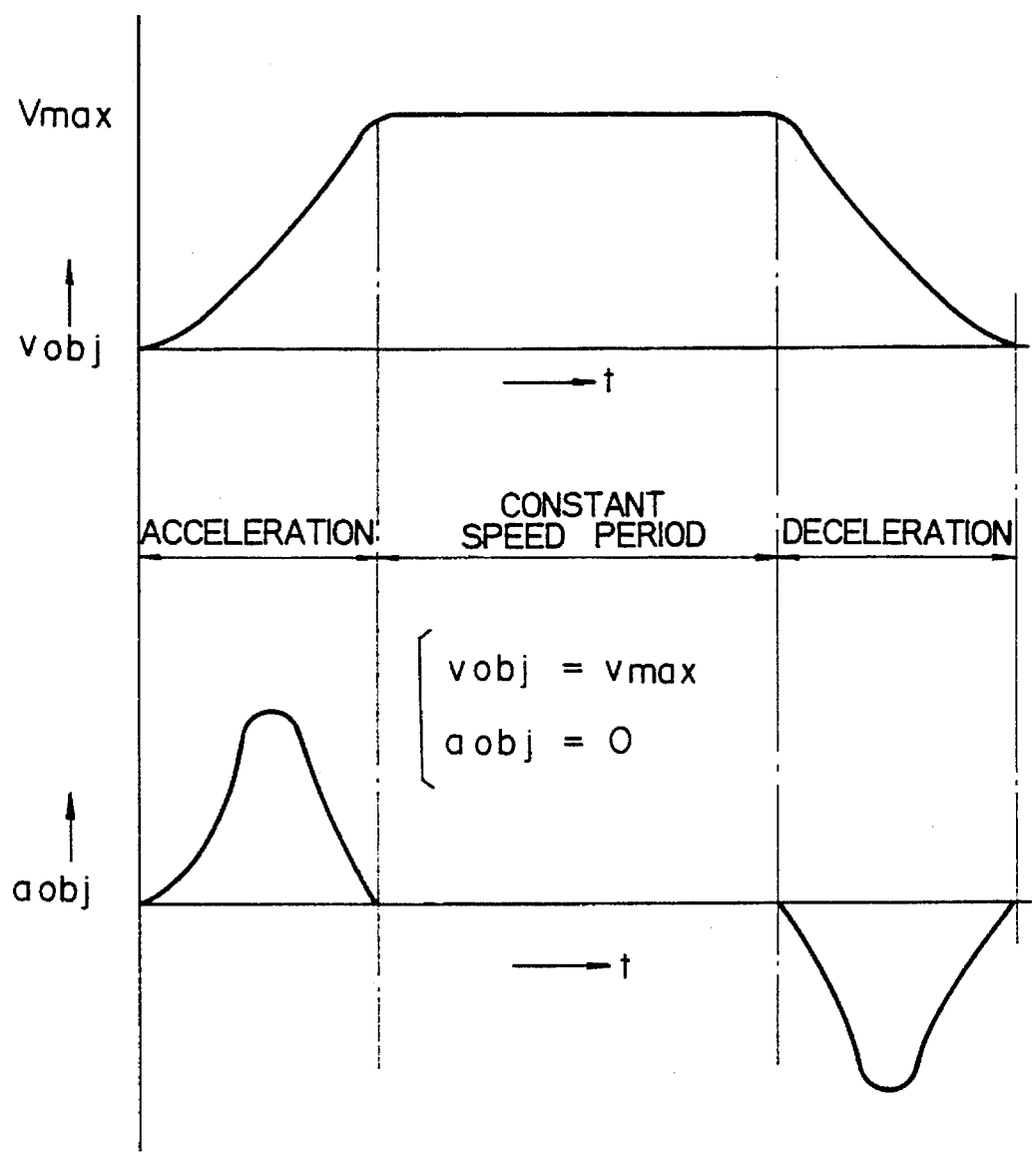
FIG. 16 is a chart showing a target speed and a target acceleration when a constant speed period is included.

There are also a variety of factors to restrict the maximum speed Vmax. These factors include a speed at which the detector 42 (see FIG. 11) is allowed to maintain position detecting accuracy, the capability of the drive circuit 40 to drive the actuator 41, a counter electromotive force of the voice coil motor constituting the actuator 41, etc. In view of this, it is discriminated whether the moving distance L is in excess of the predetermined distance Lm. More specifically, it is discriminated whether L≦Lm as in Step (d) in the flow chart of FIG. 12. If the moving distance L is long and L>Lm, a constant speed period is provided with the acceleration period and the deceleration period as shown in FIG. 16. In this constant speed period, Vmax=$v_{obj}$ and $a_{obj}$=0. In the case of the magnetic disk device, the distance Lm is generally set at about ⅓ of an entire moving range on the magnetic disk. As will be seen from FIG. 15, since the constant speed mode is used if L>Lm, T=Lm+(L−Lm)/Vmax and accordingly the target moving time T is in proportion to the moving distance L.

While there is shown a case where the speed of the actuator 41 is estimated by means of the state estimator 39 in the foregoing embodiment, it is also possible to employ a speed detector for detecting the speed of the actuator 41. Further, it is also possible to provide a table which permits TrjVn to be read directly from the remaining moving distance (L−Xn) without calculating the normalized time, and accordingly to omit the table NTable [L−Xn]. In order to emphasize the effect of the feedback control, it is effective to substitute Tn=N· Tu+Tlead in Step (m) for Tn in the equation (20) for calculating TrjUn.

As described above, one embodiment of the present invention pertains to positioning of a controlled device 1 at a designated position by calculating a target trajectory based on a moving distance of a controlled device 1 by means of trajectory generating means 5 of arithmetic control means 4, and controlling the drive means 2 by means of follow control means 6 so that the controlled device 1 follows the target trajectory. In this case, the target trajectory is calculated such that a derivative of a target acceleration is zero at a point where the controlled device 1 reaches the designated position. Accordingly, the invention is advantageous in positioning the controlled device stably because the acceleration is not changed drastically when the controlled device 1 is moved to the designated position. Further, even if the controlled device 1 reaches the designated position before lapse of a target moving time due to changes in parameters of respective components including the controlled device 1 and the drive means 2, changes of the target speed and the target acceleration are small. Thus, the controlled device can be advantageously positioned stably and at a high speed.

The target trajectory is expressed by $V_0(t/T)^k [1-(t/T)]^j$ and a power j is set 3 or larger. This allows a derivative of the target acceleration to become zero when the controlled device 1 is moved to the designated position as indicated by a curve a1 or a2 representing the target acceleration in FIG. 9 or 10.

Further, the moving speed of the controlled device 1 is estimated using a driving amount of the drive means and a sampled detected position, and a control is executed so that a difference between the estimated speed and the target speed becomes zero. Accordingly, the controlled device 1 can be moved following the target speed in such a construction as to detect the moving speed of the controlled device 1 directly. In the case where the moving speed of the controlled device 1 can be detected directly, it is sufficient to execute a control such that a difference between the moving speed thereof and the target speed becomes zero.

In the case where the target moving time T is set according to the moving distance L of the controlled device 1, the controlled device 1 can be positioned at the designated position stably and at a high speed by setting the target moving time T in proportion to a square root to a cube root of the moving distance L. Further by setting a speed feedback gain in accordance with the moving speed of the controlled device 1, the moving speed is decreased as the controlled device 1 approaches the designated position. In this case, it comes to be easier to approximate a deviation from the target trajectory to zero by making the gain larger. Also, a lead compensation time is added to the normalized time so as to compensate for response delays of respective components, thereby making it easier to approximate the deviation to zero. When the moving distance L of the controlled device 1 is in excess of a predetermined value, e.g. a constant speed mode starting distance Lm, a constant speed period is provided between an acceleration period and a deceleration period, and the controlled device 1 is moved at a maximum moving speed during the constant speed period. This is advantageous in positioning the controlled device 1 at a high speed without bringing the drive means 2 into an excessively loaded state.

Figure 17:
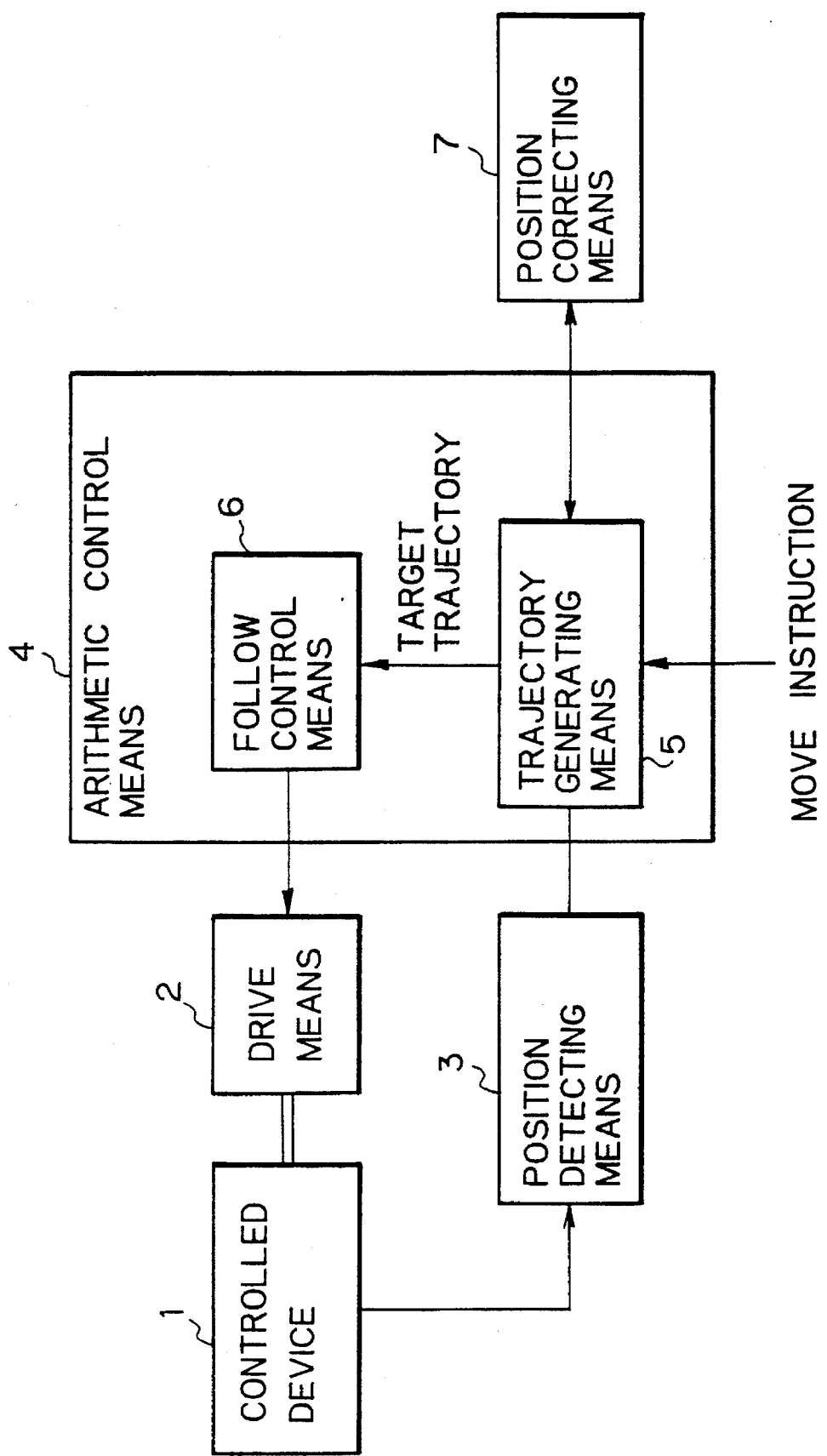
FIG. 17 is a block diagram showing an embodiment based on a second principle of the present invention.

Further, an embodiment of a positioning control system based on a second principle of the present invention will be described with reference to FIG. 17. The positioning control system comprises drive means 2 for moving and positioning a controlled device 1 at a designated position, position detecting means 3 for detecting the position of the controlled device 1, arithmetic control means 4 for controlling the drive means 2 in accordance with the position of the controlled device 1 detected by the position detecting means 3 and the designated position, and position correcting means, wherein the arithmetic control means 4 includes trajectory generating means 5 for calculating a target trajectory in accordance with an entire moving distance between a current position of the controlled device 1 and the designated position, and follow control means 6 for controlling the drive means 2 in accordance with the target trajectory from the trajectory generating means 6 and the position of the controlled device 1 detected by the position detecting means 3 so that the controlled device 1 is moved following the target trajectory; the trajectory generating means 5 predicts a position correction value when the movement of the controlled device 1 is completed in accordance with the target moving time with reference to the position correcting means 7, corrects the entire moving distance between the current position of the controlled device 1 and the designated position with the position correction value, calculates the target trajectory using an algebraic polynomial representing an acceleration-deceleration pattern; and the follow control means 6 controls the drive means 2 so that the controlled device 1 is moved following the target trajectory to be positioned at the designated position.

The controlled device 1 such as a head is moved and positioned at the designated position such as a specified track on a disk by the drive means 2 such as an actuator including a voice coil motor or the like. The position detecting means 3 detects the position of the controlled device 1 by counting the number of tracks on the disk or like way. Accordingly, upon designation of a move instruction, the arithmetic control means 4 causes the trajectory generating means 5 to calculate a virtual entire moving distance of the controlled device 1 based on the current position of the controlled device 1 and the designated position and to calculate the target trajectory corresponding to the entire moving distance.

Then, there is predicted a position where the movement of the controlled device 1 is completed in accordance with the target trajectory corresponding to the virtual entire moving distance, and the position correction value at that position with reference to the position correcting means 7. The position correcting means 7 may consist of a table storing position correction amounts corresponding to the respective controlled devices 1 and to sectors of the disks, for example, when there are provided a plurality of controlled devices 1. Thus, the position correction amount at the current position and the one at the virtual moving end are obtained, and the entire moving distance is corrected using these position correction amounts. The target trajectory is calculated based on the corrected entire moving distance. This correction processing of the entire moving distance may be repeated, thereby approximating an error of the target trajectory to zero. The target trajectory is calculated from the algebraic polynomial representing an acceleration-deceleration pattern which makes a derivative of a target acceleration zero. The follow control means 6 controls the drive means 2 so as to follow the target trajectory, and the acceleration becomes zero when the controlled device 1 reaches the designated position, thereby enabling the positioning to be carried out at a high speed.

Figure 18:
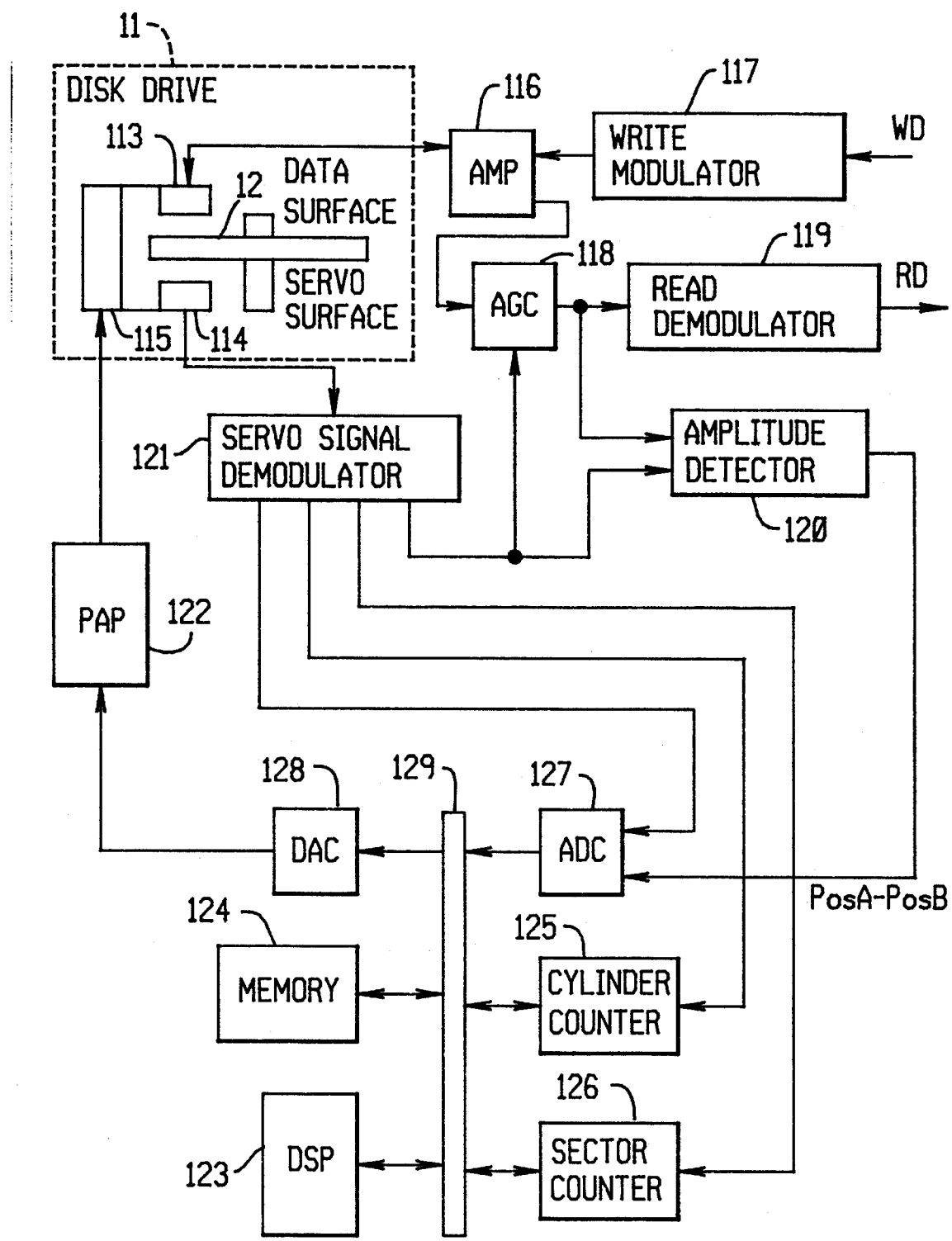
FIG. 18 is a block diagram showing another embodiment according to present invention.

FIG. 18 is a block diagram showing another exemplary embodiment of the present invention. The reference numeral 11 denotes a magnetic disk drive, 12 a magnetic disk, 113, 114 heads, 115 an actuator, 116 a read/write amplifier (AMP), 117 a write modulator for modulating a write data WD, 118 an AGC amplifier (AGC), 119 a read demodulator which outputs a read data RD, 120 an amplitude detector, 121 a servo signal demodulator, 122 a power amplifier (PAP), 123 a digital signal processor (DSP), 124 a memory, 125 a cylinder counter, 126 a sector counter, 127 an AD converter (ADC), 128 a DA converter (DAC), and 129 a bus circuit.

This embodiment shows a case where the hybrid servo system is adopted. The heads 113, 114, the actuator 15, the head 14 and the servo signal demodulator 21, a construction including the digital signal processor 123 and the memory 124, and a construction including the memory 124, in FIG. 18, correspond to a controlled device 1, drive means 2, position detecting means 3, arithmetic control means 4, and position correcting means 7, in FIG. 1, respectively. As a disk drive 11 is shown a schematic construction in which the heads 113, 114 to be positioned by means of the actuator 115 are respectively opposed to a data surface and a servo surface of one disk 12. The disk 12 is rotated at a given speed by an unillustrated spindle motor. It is also possible to provide a plurality of disks 12. In such a case, one surface of one of those disks is used as a servo surface and the remaining surfaces are used as data surfaces, and a servo information is recorded in a special track of each data surface.

The servo information is read from the servo surface of the disk 12 by the head 114, and is given to the servo signal demodulator 121. The demodulated two-phase servo signal is applied to the AD converter 127; a cylinder crossing pulse obtained as the head 114 moves is applied to the cylinder counter 125; and a sector pulse is applied to the sector counter 126. Further, a timing signal is applied to the AGC amplifier 18 and the amplitude detector 120. The write data WD is modulated in accordance with a modulation system such as an MFM by the write modulator 117, and is amplified by the read/write amplifier 116. The amplified write data WD is sent to the head 113 to be written in the disk 12. The signal read from the disk 12 by the head 113 is amplified by the read/write amplifier 116, and is then amplified by the AGC amplifier 118 so as to attain a specified level. Thus amplified signal is demodulated by the read demodulator 119 into a read data RD.

The AGC amplifier 118 exercises an AGC function to an AGC section while holding the same to PosA and PosB sections when the servo information is read from the special cylinder by the head 113. The AGC amplifier 18 also causes the amplitude detector 120 to detect a difference between reproduced signals in the PosA and PosB sections, and sends the detected difference to the AD converter 127. More specifically, the displacement can be defined as the difference between the position in accordance with the servo information obtained through the head 114 and the position in accordance with the servo information obtained through the head 113. Amounts of displacement are obtained, for example, for each sector or every a specified number of sectors, and are stored in a position correction table formed in the memory 124.

The content of the cylinder counter 125 indicates the current cylinder positions of the heads 113, 114 and the content of the sector counter 126 indicates the current sector positions of the heads 113, 114, and accordingly the digital signal processor 123 can calculate the moving distance of the heads to the designated position. Since the displacement is not taken account of in the moving distance, the target trajectories are corrected with reference to the position correction table and the actuator 115 is controlled through the power amplifier 122 so that the heads are moved following the corrected target movement trajectories.

FIG. 9 is a function block diagram showing the arithmetic control means of another embodiment of the present invention. The reference numeral 31 denotes a trajectory generator, 132 a follow controller, 133 a position corrector, 134 a drive circuit, 135 an actuator, at 136 a detector, at 137 a moving time calculator, at 138 a moving distance correction calculator, at 139 a moving distance recalculator, at 140 a gain calculator, at 141 a driving state discriminator, 142 a normalized time calculator, 143 a trajectory calculator, 144 a position correction table, 145 a state estimator, and 146 a state controller. The arithmetic control means including the trajectory generator 131 and the follow controller 132 is realized by a computing function of the digital signal processor 123.

A moving distance indicated value $L_0$ and a constant speed mode starting distance Lm are given to the moving time calculator 137; the sector number Sold at the start of movement is given to the moving distance correction calculator 138; and the head number Hold selected before the start of movement and the head number Hnew to be selected upon completion of the movement are given to the position corrector 133. In other words, when the heads are switched, the previous head number Hold and the new head number Hnew are given to the position corrector 133. The moving time calculator 137 calculates a virtual target moving time Td, a maximum speed Vmax, and a virtual moving distance Ld. In this case, the correction in accordance with the equation (4) is not made. The moving distance correction calculator 38 calculates a moving distance correction amount Lcorr based on the virtual target moving time Td and the maximum speed Vmax from the moving time calculator 137, the sector number Sold at the start of the movement, and the position correction amount from the position correction table 144. The moving time recalculator 139 calculates a target moving time T, an acceleration/deceleration distance Ldrv, and a corrected entire moving distance L based on the moving distance correction amount Lcorr and the virtual moving distance Ld. The gain calculator 140 calculates a feedforward gain Gff and the maximum speed Vmax based on the target moving time T and the acceleration/deceleration distance Ldrv.

To the driving state discriminator 141 are input the constant speed mode starting distance Lm, the acceleration/deceleration distance Ldrv, the corrected entire moving distance L, and a position Xn of the head detected by the detector 136. The discriminator 41 generates a control state information (state) indicative of an acceleration period, a deceleration period, or a constant speed period, and calculates the remaining moving distance L−Xn. It is understood that the detected position Xn is expressed in the form of the distance from the original position. The normalized time calculator 42 then calculates the normalized time Tn. The trajectory calculator 143 calculates a feedforward current TrjUn and a target speed TrjVn in accordance with the feedforward gain Gff, the maximum speed Vmax, and the normalized time Tn.

The state estimator 145 of the follow controller 132 calculates an estimated speed EstVn in accordance with the detected position Xn from the detector 136 and a drive current Un from the state controller 146 which are input thereto. The state controller 146 calculates the drive current Un in accordance with the feedforward current TrjUn and the target speed TrjVn which are input thereto and sends the same to the drive circuit 134. The drive circuit 134 in turn applies the drive current to the actuator 135 so as to carry out the positioning.

Figure 20:
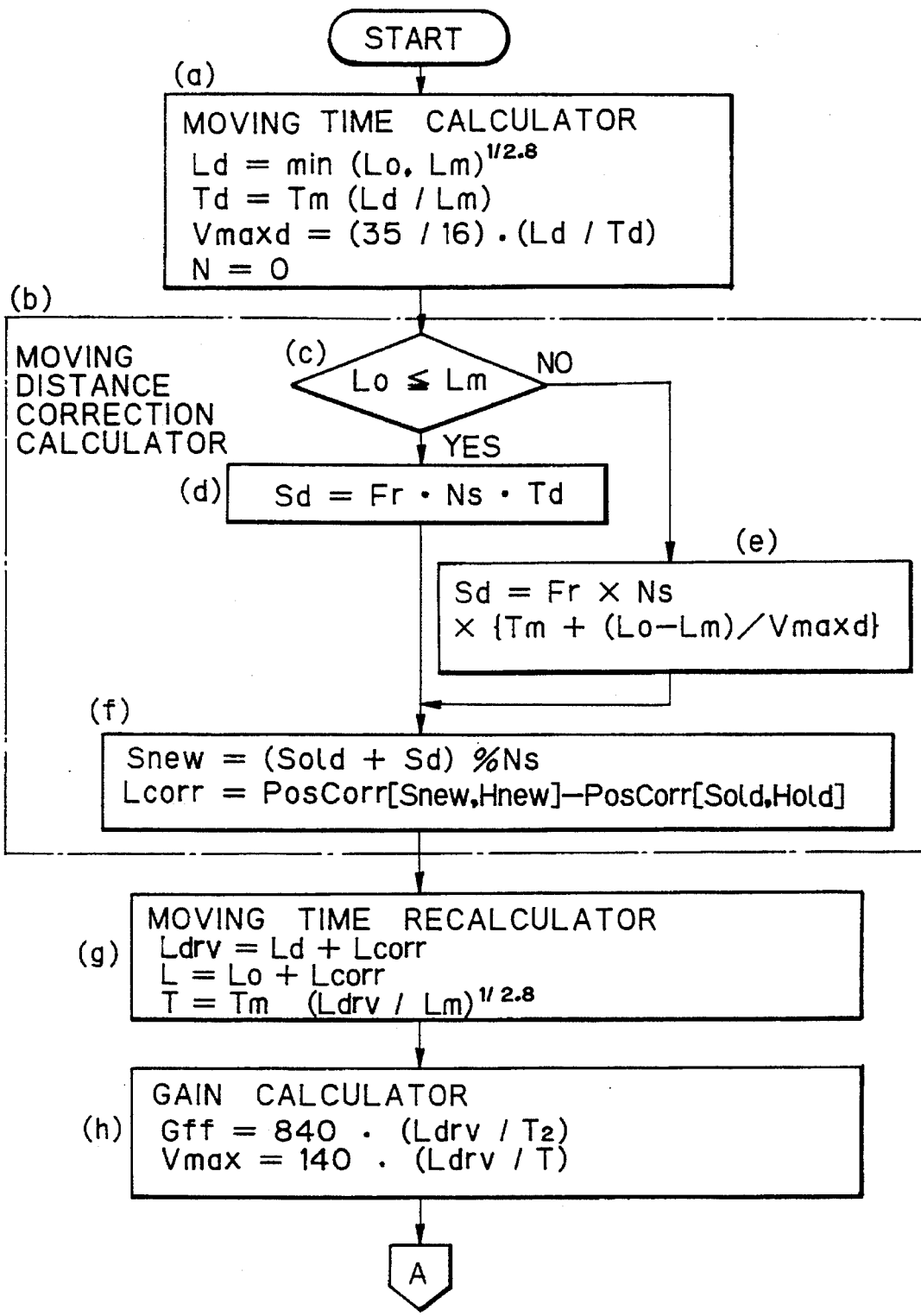
FIG. 20 is a flow chart showing an operation of another embodiment.

FIGS. 20 and 21 are flow charts showing an operation of the embodiment of the invention. Operations of respective components are shown in Steps (a) to (u). As described above, to the trajectory generator 31 are input the constant speed mode starting distance Lm, the moving distance $L_0$ between the current position and the designated position, the current count value of the sector counter, i.e. the sector number Sold at the start of the movement, and the detected position Xn from the detector 136. To the position correction table 144 of the position corrector 133 are input the head selection addresses before and after the movement, i.e. the head number Hold of the head at the current position and the head number Hnew of the newly selected head.

Step (a):

The moving time calculator 137 calculates the virtual acceleration/deceleration distance Ld, the virtual target moving time Td, and the virtual maximum speed Vmax in accordance with the instructed moving distance $L_0$ and the constant speed mode starting distance Lm using the following equations.

$$Ld=\min(L_0, Lm) \quad (34)$$

$$Td=Tm\,(Ld/Lm)^i \quad (35)$$

$$Vmaxd=(35/16)\cdot(Ld/Td) \quad (36)$$

$$N=0 \quad (37)$$

In the equation (34), min (x, y) indicates selection of the smaller of x and y. Specifically, the smaller of the instructed moving distance $L_0$ and the constant speed mode starting distance Lm is set as the virtual acceleration/deceleration distance Ld. In the equation (35), Tm denotes a target moving time when L=Lm, and i can be selected within a range of about ½ to ⅓. In this embodiment, Tm is assumed as a design value of a mean seek time of the magnetic disk device and i is set to be ½.8. Since it is inferred from the equation (12) as described before, that the maximum target speed on the trajectory is attained when $t_n=1/2$, the virtual maximum target speed Vmaxd in this case is expressed as in the equation (36). Further, a count value of a counter N for counting the number of sampling is reset to 0.

Step (b):

Step (b) consists of Steps (c) to (f). The moving distance correction calculator 138 calculates the moving distance correction amount Lcorr in accordance with the virtual target moving distance Td and the virtual maximum target speed Vmaxd which are input thereto. First of all, it is discriminated whether $L_0 \leq Lm$ in Step (c). In respective discrimination Steps, N indicates negation while Y indicates affirmation. If $L_0 \leq Lm$, i.e. the virtual moving distance $L_0$ is not longer than the constant speed mode starting distance Lm, the number of sectors Sd the head passes during the movement is calculated using the following equation since constant speed mode is not included.

$$Sd=Fr\cdot Ns\cdot Td \quad (38)$$

wherein Fr denotes a rotating speed of the magnetic disk per second and Ns denotes the number of sectors per track. If $L_0 > Lm$ in Step (c), the constant speed mode is included since the virtual moving distance $L_0$ is longer than the constant speed mode starting distance Lm. Thus, the sector number Sd the head passes during the movement is calculated in Step (e) using the following equation.

$$Sd=Fr\cdot Ns\cdot[Tm+\{(L_0-Lm)/Vmaxd\}] \quad (39)$$

Here, $(L_0-Lm)/Vmaxd$ indicates a time during which the head is moved in the constant speed mode and Tm indicates a time required for acceleration and deceleration.

In Step (f), the count value Snew of the sector counter when the movement is completed is estimated. Specifically, since the current sector count value is Sold and the head passes the sectors of Sd, the count value Snew is estimated as follows.

$$Snew=(Sold+Sd) \% Nd \quad (40)$$

Here, "%" indicates a modulo (remainder) symbol of operation, and Snew is a remainder when (Sold+Sd) is divided by Nd. Accordingly, Snew is an integer in a range between 0 and Ns−1.

With the estimated sector count value Snew, the correction amount Lcorr relative to the virtual moving distance $L_0$ is calculated using the following equation.

$$Lcorr=PosCorr[Snew, Hnew]-Poscorr[Sold, Hold] \quad (41)$$

Here, Poscorr [] indicates the position correction table 144 of the position corrector 33, and the position correction table 144 is referred to using the sector count value and the head selection address as pointers. Thus, in order to calculate the correction amount Lcorr, the position correction table is referred to twice.

Step (g):

The correction amount Lcorr is either a positive value or a negative value. The moving time recalculator 39 corrects the virtual acceleration/deceleration distance Ld and the virtual moving distance $L_0$ with the correction amount Lcorr into an approximate acceleration/deceleration distance Ldrv and an approximate entire moving distance L using the following equations.

$$Ldrv=Ld+Lcorr \quad (42)$$

$$L=L_0+Lcorr \quad (43)$$

Then, with the approximate acceleration/deceleration distance Ldrv obtained by the equation (42), the target moving time T is calculated in an approximate manner using the following equation.

$$T = Tm \cdot (Ldrv/Lm)^{1/2.8} \qquad (44)$$

Step (h):

The gain calculator 140 calculates the feedforward gain Gff and the maximum speed Vmax in accordance with the target moving time T and the acceleration/deceleration distance Ldrv using the following equations.

$$Gff = 840 \times (Ldrv/T^2) \qquad (45)$$

$$Vmax = 140 \, (Ldrv/T) \qquad (46)$$

Figure 21A:
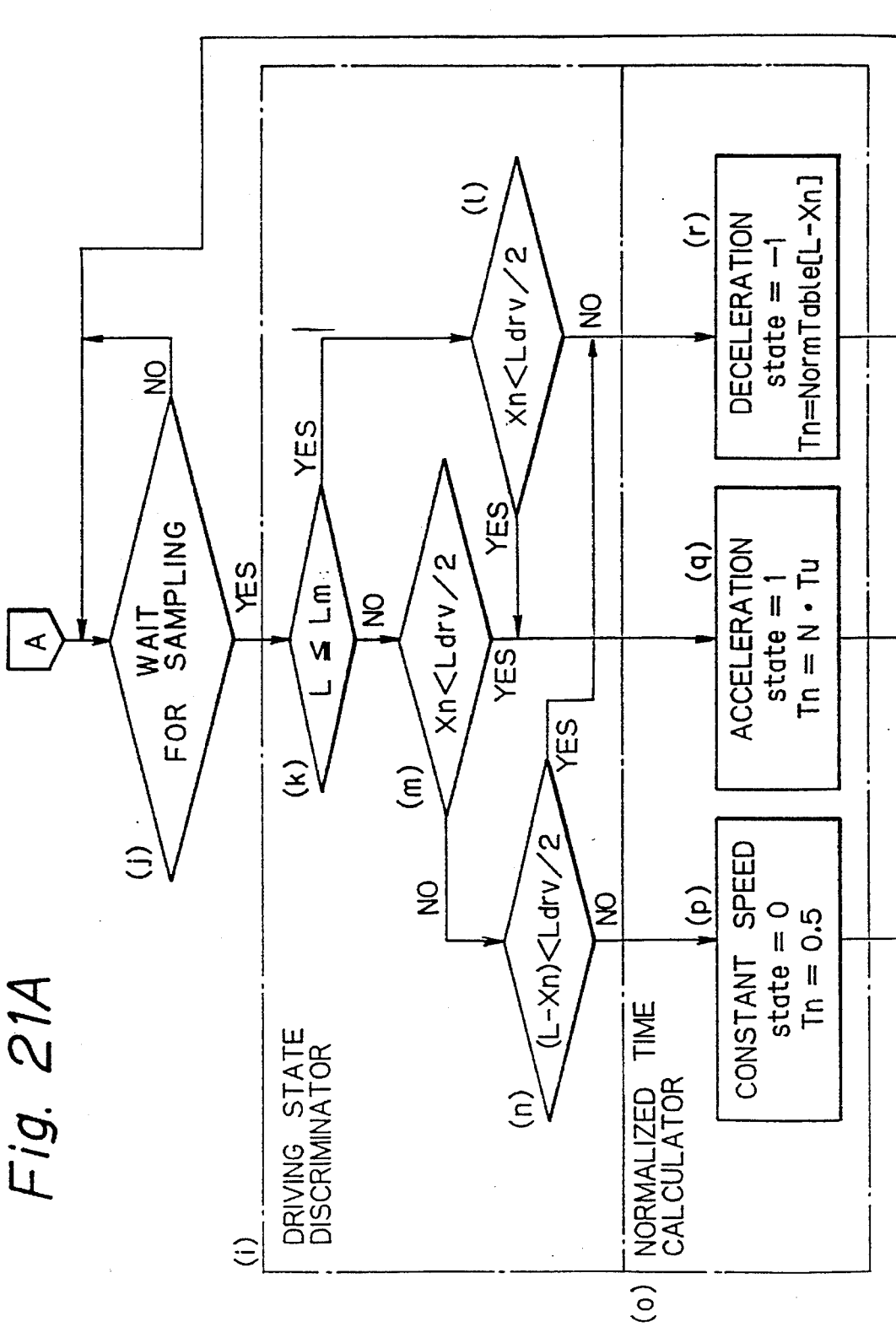
FIGS. 21(A) and 21(B) are flow chart showing an operation of another embodiment.
Figure 21B:
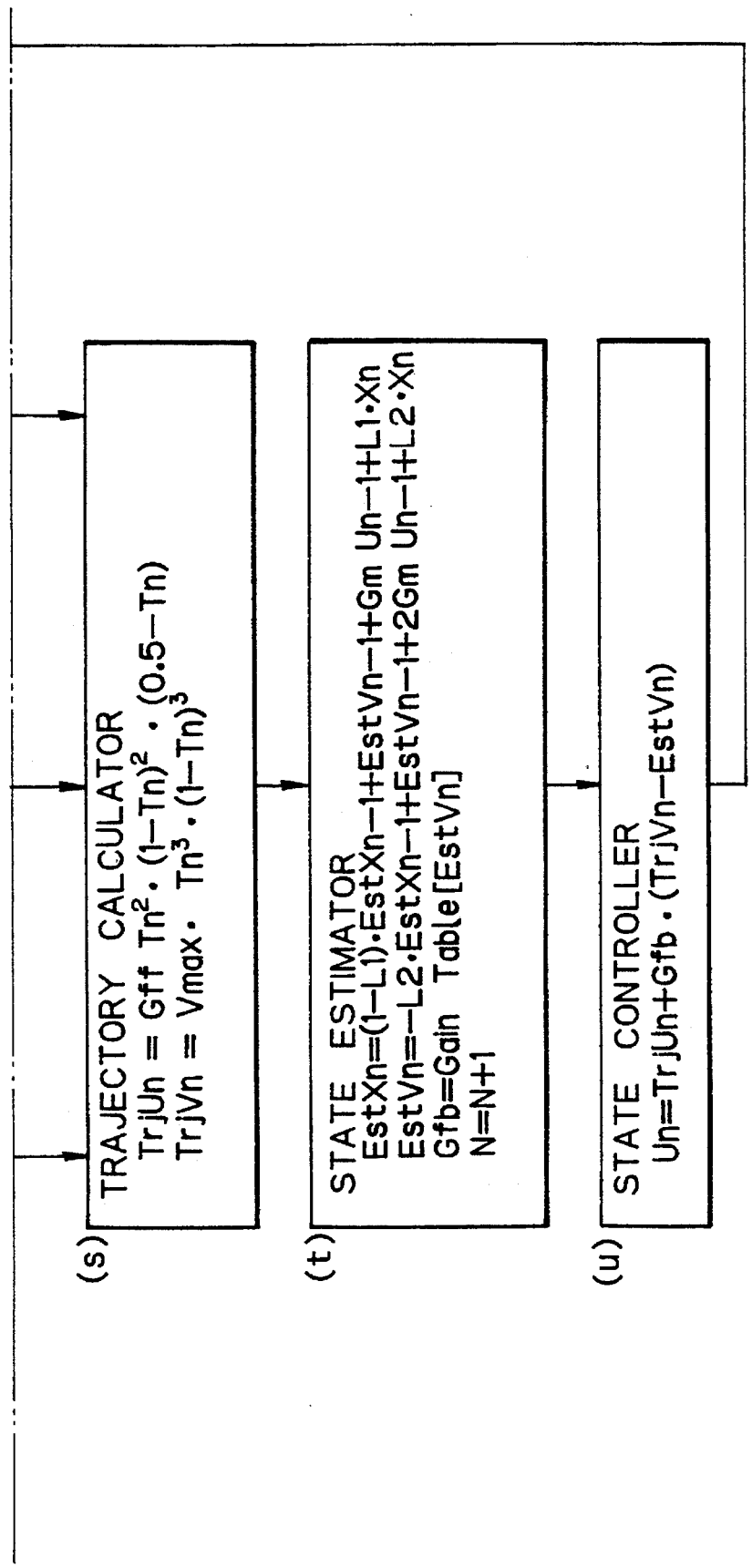

Step (i):

Step (i) consists of Steps (k) to (n) as shown in FIG. 21(A). The driving state discriminator 141 carries out processings in Steps (k) to (n) in accordance with the acceleration/deceleration distance Ldrv, the moving distance L, and the detected position Xn from the detector 136 which are input thereto. Further, processings in Steps (j) to (u) as shown in FIG. 21(B) are repeated based on the detected position Xn which is obtained in each sampling period. Specifically, in Step (j), when it is determined that an input data has been obtained by the sampling (Y), this routine proceeds to Step (i) in which the processings are carried out in Step (k) and subsequent Steps. In Step (i), it is first discriminated whether L≦Lm in Step (k). If L≦Lm, i.e. the constant speed mode is not included since the moving distance L is not longer than the constant speed mode starting distance Lm, it is discriminated whether Xn <(Ldrv/ 2) in Step (1). If Xn<(Ldrv/2), i.e. the detected position Xn is shorter than half the acceleration/deceleration distance Ldrv, an accelerating state (state =1) is determined. The target acceleration in this case lies in a range of the normalized time $t_n$, $0 \leq t_n \leq 1/2$, as shown in FIG. 10. Accordingly, the head is determined to be in the accelerating state or decelerating state by discriminating whether the detected position Xn is in excess of half the acceleration/deceleration distance Ldrv.

If Xn ≧(Ldrv/2) in Step (1), a decelerating state (state =−1) is determined. If L>Lm, i.e. the constant speed mode is put between the acceleration mode and the deceleration mode because the moving distance L is longer than the constant speed mode starting distance Lm, in Step (k), it is discriminated whether Xn<(Ldrv/2) in Step (m). If Xn<(Ldrv/2), the accelerating state (state =1) is determined. If Xn≧(Ldrv/2) in Step (m), it is discriminated whether (L−Xn)<(Ldrv/2) in Step (n). If (L−Xn)<(Ldrv/2), the decelerating state (state =−1) is determined. If (L−Xn)≧(Ldrv/2), the constant speed state (state =0) is determined. The remaining moving distance is given by an expression (L−Xn).

Step (o):

The normalized time calculator 142 calculates the normalized time Tn by carrying out processings of Steps (p), (q), and (r). To the normalized time calculator 142 are input the normalized sampling time Tu=Ts/T (where Ts denotes a sampling period), the control state, and the remaining moving distance (L−Xn). At the time of the accelerating state (state =1), the normalized time Tn is calculated as follows in Step (q): Tn =N·Tu. In this case, N indicates n-th sampling from the start of the trajectory calculation. At the time of the constant speed state (state =0), the normalized time Tn is set at 0.5 in Step (p). At the time of the decelerating state (state =−1), the normalized time Tn is calculated as follows in Step (r): Tn=NormTable [L−Xn]. NormTable [L−Xn] is a table of values solved for x in an equation with respect to the normalized target position y:y=x⁴ (35−84x+ 70x²−20x³). With the use of this table, the normalized time can be obtained from the actually measured position. For example, the table may store values of x as related to values of y=0.5 to 1.0.

Step (s):

To the trajectory calculator 142 are input the feedforward gain Gff and the maximum speed Vmax from the gain calculator 140 and the normalized time Tn from the normalized time calculator 142, in accordance with which the trajectory calculator 142 calculates a feedforward current TrjUn and a target speed TrjVn using the following equations.

$$TrjUn = Gff \cdot Tn^2 \, (1-Tn^2) \, (0.5-Tn) \qquad (47)$$

$$TrjVn = Vmax \cdot Tn^3 \, (1-Tn^3) \qquad (48)$$

The calculation results are input to the state controller 46 of the follow controller 132.

Step (t):

To the state estimator 145 provided in the follow controller 132 are input the detected position Xn from the detector 136 and a drive current Un from the state controller 146, in accordance with which the state estimator 145 calculates an estimated position EstXn, an estimated speed EstVn, and a feedback gain Gfb using the following equations.

$$EstXn = (1-L_1) \, EstXn-1 + EstVn-1 + Gm Un-1 + L_1 \cdot Xn \qquad (49)$$

$$EstVn = -L_2 \cdot EstXn-1 + EstVn-1 + 2Gm \cdot Un-1 + L_2 \cdot Xn \qquad (50)$$

$$Gfb = GTable \, [EstVn] \qquad (51)$$

wherein a constant Gm is expressed as follows:

$$Gm = (Kf \cdot Ts^2 \cdot Gdrv \cdot Gsns)/(2M \cdot Ltp).$$

Here, Gdrv denotes a gain of the drive circuit 134, Gsns denotes a gain of the detector 136, and Ltp denotes a track pitch. Further, indicated as $L_1$, $L_2$ are constants for determining the characteristic of the state estimator (observer). These constants are determined using a design method of the state estimator. This design method is explained in detail, for example, in "Digital Control of Dynamic Systems, as mentioned before. The equation (51) indicates that the feedback gain Gfb is read from a table Gtable [EstVn] storing the feedback gains Gfb in accordance with the estimated speed EstVn. Further, a content of the sampling counter is incremented by one (N =N+1).

Step (u):

To the state controller 146 are input the feedforward current TrjUn, the target speed TrjVn, the estimated speed EstVn, and the feedback gain Gfb, in accordance with which the state controller 146 calculates a drive current Un using the following equation.

$$Un = TrjUn + Gfb \cdot (TrjVn - EstVn) \qquad (52)$$

By applying the drive current Un to the actuator 135 through the drive circuit 135, the head can be moved following the target trajectory and can be controllably positioned at the designated position stably.

Figure 19:
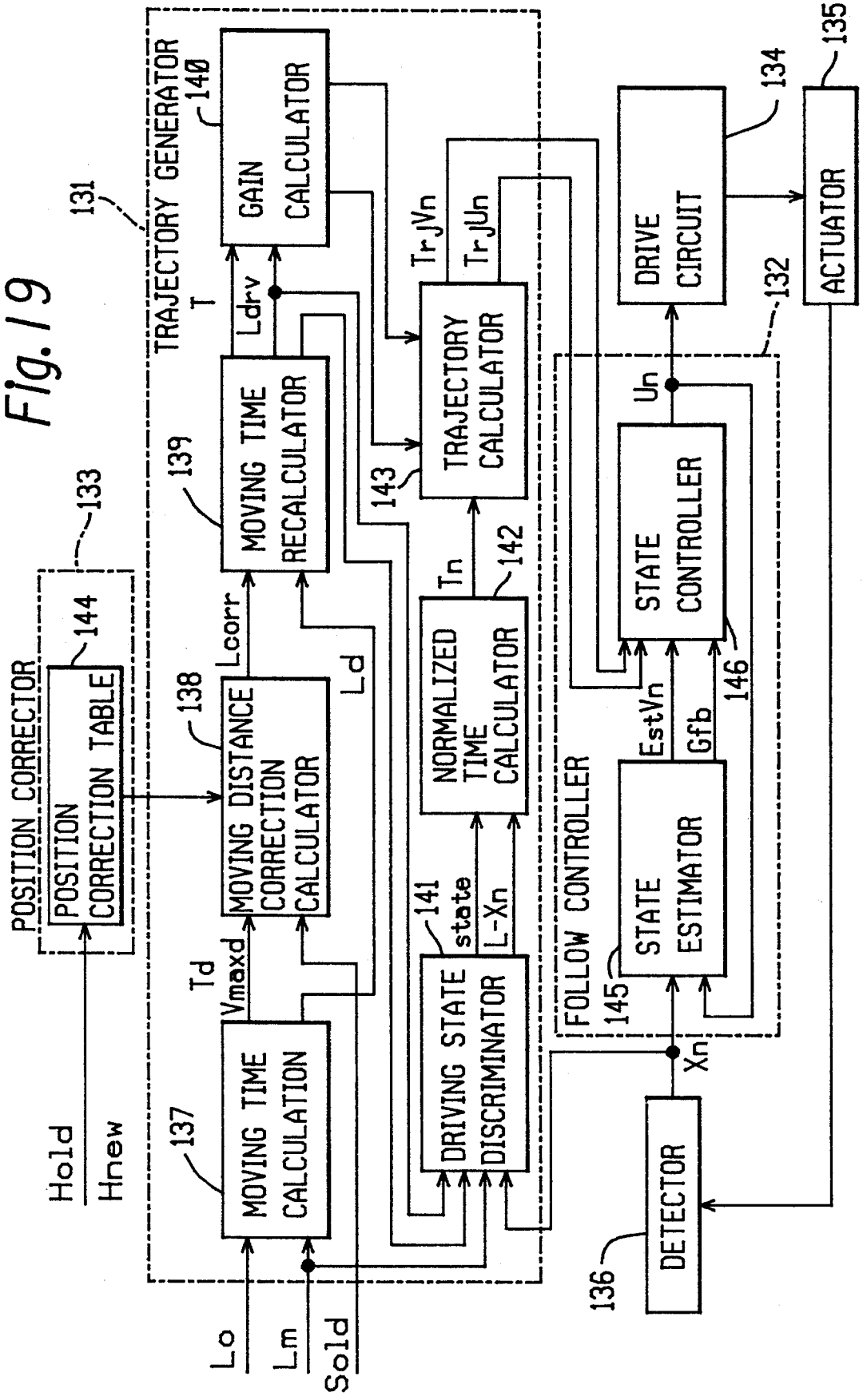
FIG. 19 is a block diagram showing arithmetic control means of another embodiment.
Figure 22:
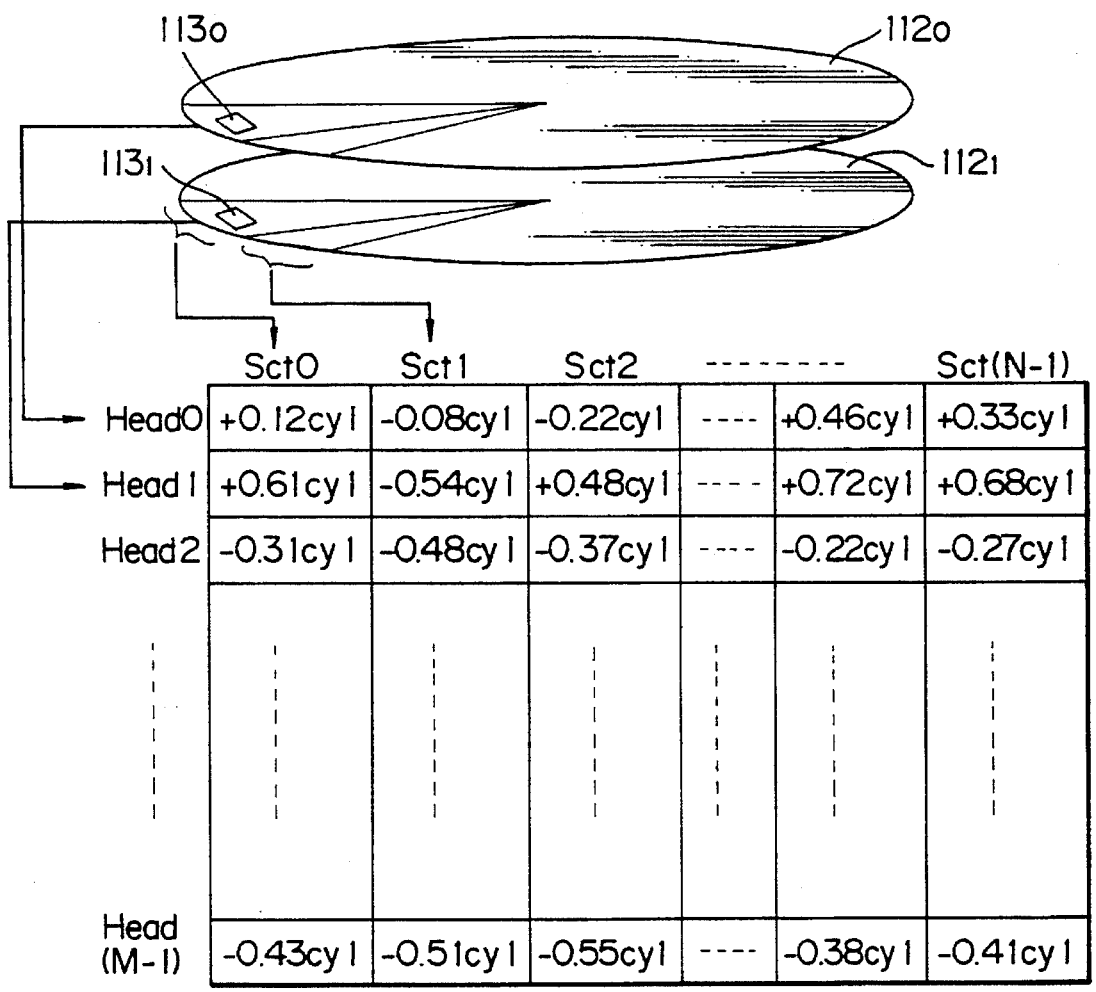
FIG. 22 is a diagram showing a position correction table of another embodiment.

FIG. 22 is a diagram showing the position correction table. In the position correction table 44 of the position corrector (see FIG. 19) are stored position correction amounts in N sectors (sector numbers Sct0 to Sct(N−1) in a unit of cylinder (cyl) in correspondence with M heads (head numbers Head0 to Head(M−1). For example, the position correction amount of the head $13_0$ (Head0) positioned in the sector Sct0 of the disk $12_0$ is +0.12; the position correction amount of the head $13_1$ (Head1) positioned in the sector Sct0 of the disk $12_1$ is +0.61; and the position correction amount of unillustrated head (Head2) is −0.31. Contents of the position correction table 144 can be corrected at any time by calculating the position correction amounts based on the positions obtained from the servo information stored in the servo dedicated surface and those obtained from the servo information stored in the special track of the data surface when the control system is powered on or upon lapse of a specified time.

Accordingly, the position correction table 144 is accessed using the sector number Sold of the current position and the head number Hold before the movement, and the position correction amount $L_{c0}$ is read. The position correction table 144 is accessed again using the sector number Snew at the completion of the movement which is predicted based on the virtual moving distance Ld and the newly selected head number Hnew, and the position correction amount $L_{c1}$ is read. By computing in accordance with the equation (41) using the read position correction amounts, the correction amount Lcorr used in correcting the virtual moving distance Ld can be obtained. More specifically, the entire moving distance between the current position and the designated position is assumed as the virtual entire moving distance Ld, and the virtual target moving time Td is calculated based on the virtual entire moving distance Ld. The virtual target trajectory in accordance with the virtual target moving time Td is calculated, and thereby the position correction amount at the position where the movement is completed is obtained. Thereupon, the virtual moving distance Ld is corrected to obtain the distance the head is actually moved. Since the position correction amount is a decimal smaller than 1 cylinder, the positioning can be approximated at the accuracy of the order of smaller than 1 cylinder. In the case where the moving distance of the required accuracy cannot be obtained by one correction, the aforementioned processing is repeated assuming the corrected entire moving distance as a virtual moving distance. Besides the magnetic disk drive and the optical disk drive, the present invention is applicable to a variety of controlled devices used in controlling the positioning.

As described above, another embodiment of the present invention pertains to calculation of target trajectories by, in trajectory generating means 5 of arithmetic control means 4, calculating a virtual target trajectory assuming an entire moving distance between a current position and a designated position as a virtual entire moving distance, calculating a position correction amount when movement of a controlled device 1 is completed with reference to position correcting means 7, and correcting the virtual entire moving distance with the position correction amount. When the invention is applied to a magnetic disk device, displacements among a plurality of heads are also corrected to carry out the positioning accurately. The target trajectories are calculated from algebraic polynomials representing acceleration-deceleration patterns. In accordance with the target trajectories, follow control means 6 controls drive means 2. Accordingly, the invention is advantageous in positioning the controlled device 1 at the precise designated position having the displacement corrected at a high speed and stably.

Figure 23:
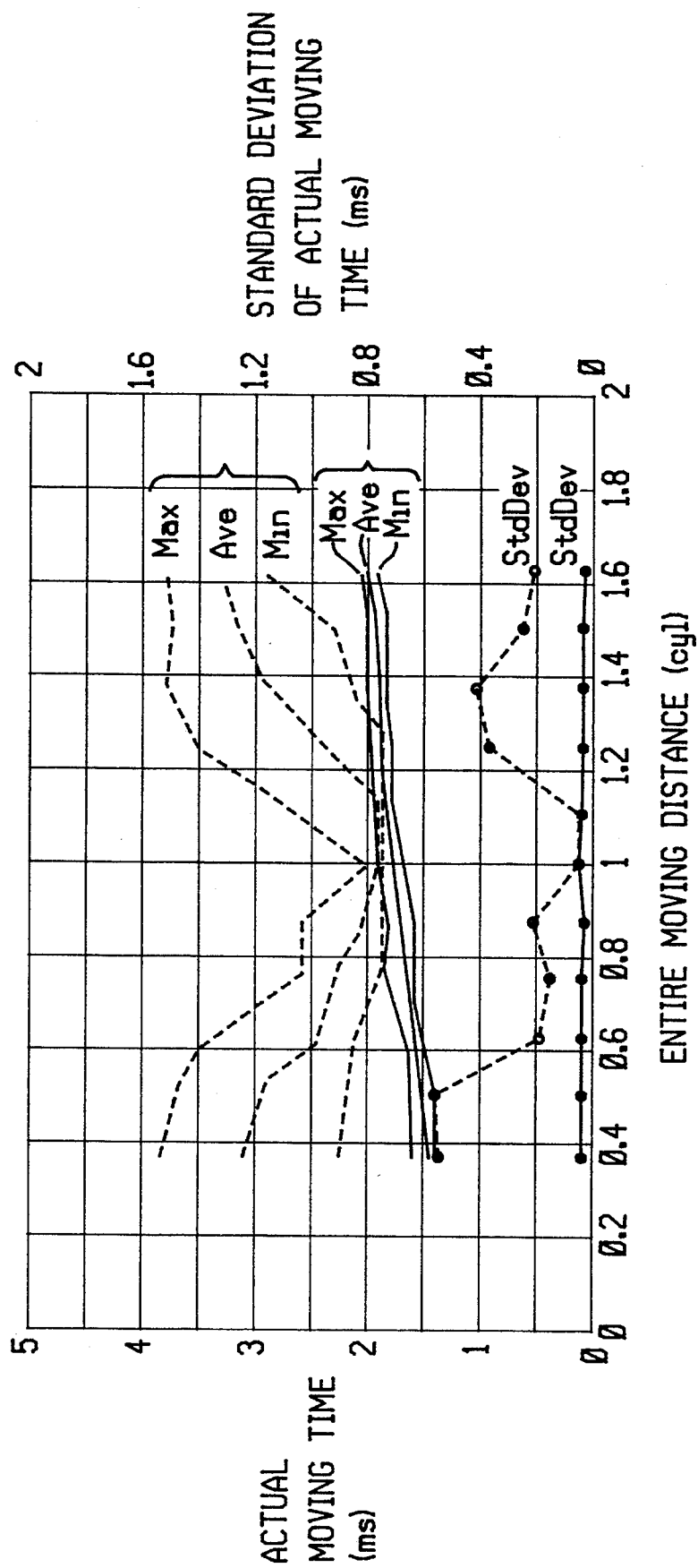
FIG. 23 is a graph showing effects of another embodiment.

FIG. 23 is a graph showing effects of the another embodiment of the invention, wherein a horizontal axis represents the entire moving distance [cyl] in a unit of cylinder, a left vertical axis represents an actual moving time [ms] in actual measurements, and a right vertical axis represents a standard deviation of distribution of the actual moving time. Further, solid line curves represent the present embodiment while dotted line curves represent the prior art. Max, Ave, Min respectively indicate a maximum value, an average value, and a minimum value of the distribution of the actual time when a move instruction of 1 cylinder is given, and StdDev indicates the standard deviation. Specifically, the entire moving distance after the position correction varies in a range of 0.375 to 1.625 cylinders for the move instruction of 1 cylinder. In the case where the position correction amount is zero, the movement is completed in the actual moving time of about 2 ms both in the present embodiment and the prior art, and the variation range in this case is small.

However, when the position correction is made, according to the present embodiment, the corrected entire moving distance including a value of smaller than 1 cylinder accompanying the position correction is calculated, and the target trajectories are calculated based on the corrected entire moving distance. Accordingly, the maximum value Max and the minimum value Min vary within small ranges and the actual moving time varies in a range of 1.5 ms to 2 ms in proportion to the entire moving distance of 0.375 to 1.625. As opposed to the present embodiment, the prior art executes such a control as to calculate the target trajectories for the move instruction of 1 cylinder and to correct the displacement after the controlled device reaches the designated position, and accordingly has a characteristic indicated by the V-shaped dotted curves as related to the entire moving distance. It is seen that the larger the position corrected amount, the more difficult to position the controlled device accurately. For example, when the entire moving distance is 0.4 cylinders, the maximum value Max and the minimum value Min of the actual moving time are respectively 3.8 ms and 2.2 ms. As compared to the present embodiment, the actual moving time is long and varies greatly in the prior art. As indicated by standard deviation curves StdDev, the invention is advantageous in that the actual moving time varies within a small range, and the controlled device can be positioned stably and at a high speed.

Figure 24:
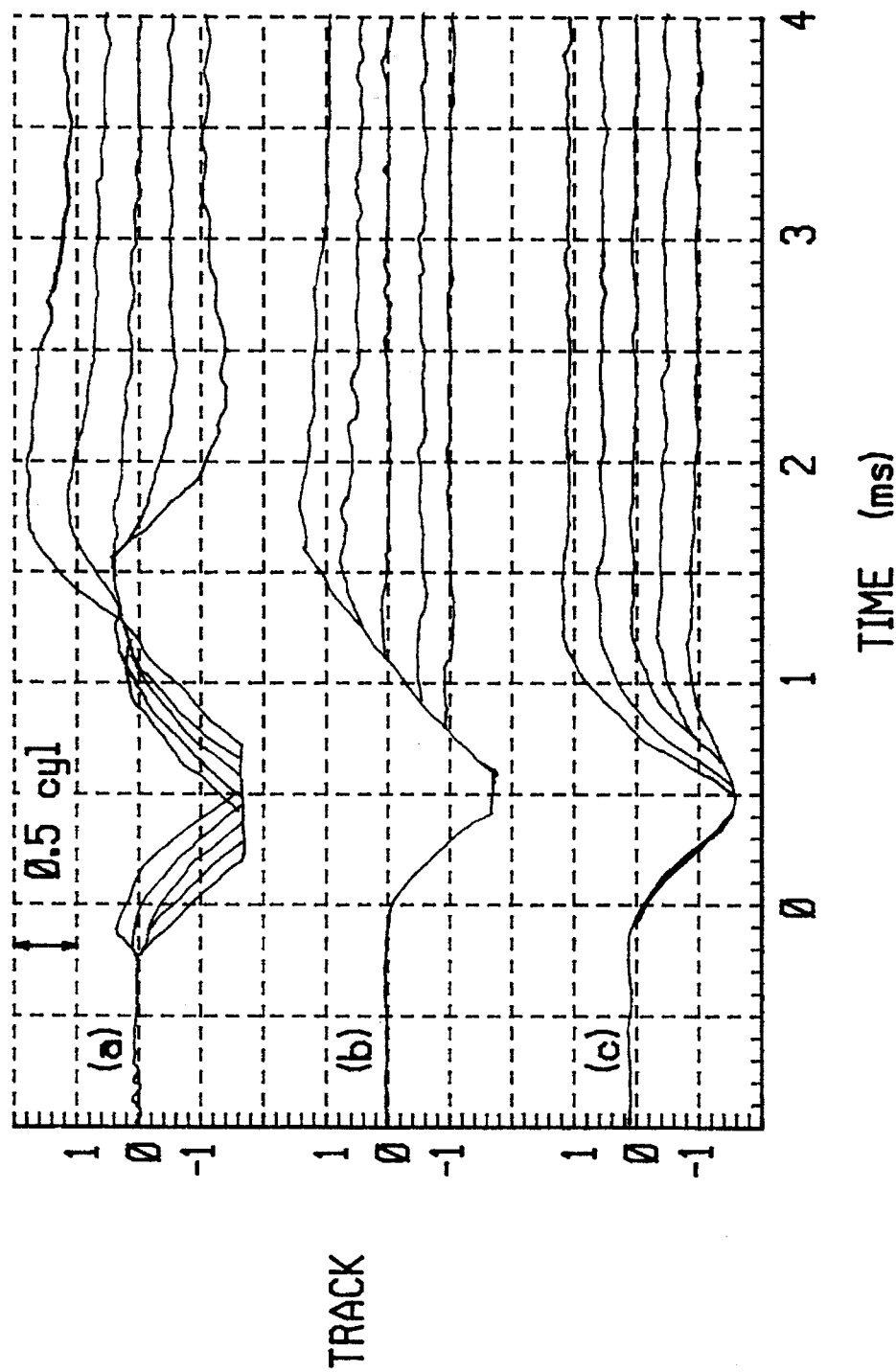
FIG. 24 is a graph for a comparison between effect of a prior art and embodiments.

Finally, to emphasize the effect of this another embodiment, the difference of experimental data between a prior art and the above-mentioned two kinds of embodiments, in the case where a continuous seek operation (1.5–2.5 tracks) is executed, is illustrated in FIG. 24. More specifically, (a) of FIG. 24 shows a time chart of such a seek operation of the prior art, and (b) and (c) shown time charts of the seek operations of the one and the another embodiment, respectively.

In (a) of FIG. 24, since the target moving time of a head cannot be estimated, the extra time is taken to arrive at the designated track position. On the contrary, in the case of (b), since the target moving time can be estimated, the seek time becomes shorter than that in the case of (a). Further in the case of (c), an amount of displacement of the designated track position is predicted and the target trajectory can be corrected previously. Therefore, the seek operation can be completed in minimized moving time.

I claim:

1. A positioning control system for a controlled device comprising:

drive means for moving and positioning said controlled device to a designated position;

position detecting means for detecting the position of said controlled device; and arithmetic control means for controlling said drive means in accordance with the position of said controlled device detected by said position detecting means and said designated position, wherein said arithmetic control includes:

moving time calculating means for calculating the target moving time for moving said controlled device by a certain moving distance from a current position of said controlled device to said designated position thereof;

gain calculating means for calculating a gain in accordance with said target moving time and said moving distance;

trajectory calculating means for calculating a target trajectory using an algebraic polynomial represented by said target moving time, said gain and an elapsed time, said algebraic polynomial at least making a target position said designated position when said elapsed time is equal to the target moving time; and following control means for controlling said drive means in accordance with said target trajectory calculated by said trajectory calculator and the position of said controlled device detected by said position detecting means while causing the position of said controlled device to follow said target trajectory.

2. A positioning control system as set forth in claim 1, wherein the target trajectory is expressed by a polynomial, $V_0(t/T)^k[1-(t/T)]^j$, where T denotes target moving time, t denotes an elapsed time whose initial value is 0, $V_0$ denotes a constant, powers j and k are positive numbers, and the power j is set at 3 or larger.

3. A positioning control system as set forth in claim 1, wherein the target trajectory is expressed by a polynomial, $V_0(t/T)^k[1-(t/T)]^g$, where T denotes a target moving time, t denotes an elapsed time whose initial value is 0, $V_0$ denotes a constant, a power g is set at 3 or larger, and a power k is set 2 or larger.

4. A positioning control system as set forth in claim 1, wherein the moving time calculation means estimates the moving time of the controlled device between the current position and the designated position in proportion to a square root of a cubed root of the moving distance.

5. A positioning control system as set forth in claim 1, wherein the position of the controlled device is detected by the position detecting means, an estimated speed of the controlled device is calculated in accordance with a detected position information for each sample and a driving amount of the drive means which moves the controlled device, and a speed feedback gain corresponding the estimated speed is set.

6. A positioning control system as set forth in claim 1, wherein a normalized time is calculated based on a detected position information from the position detecting means, and a response delay is added to the calculated normalized time so as to compensate for response delay.

7. A positioning control system as set forth in claim 1, wherein a constant speed period is provided between an acceleration period and a deceleration period which are determined in accordance with the target trajectory when the moving distance of the controlled device is longer than a predetermined value.

8. A positioning control system as set forth in claim 1, wherein the controller device is comprised of a magnetic head which is movable on a magnetic disk and said drive means is comprised of an actuator for positioning the magnetic head at a designated track position on the magnetic disk.

9. A positioning control system as set forth in claim 1, wherein the controlled device is comprised of an optical head which is movable on an optical disk and the drive means is comprised of an actuator for positioning the optical head at a designated position on the optical disk.

10. A positioning control system as set forth in claim 1, wherein the controller device is comprised of a print head which is movable on a printing sheet and the drive meads is comprised of an actuator for positioning the print head at a designated position on the printing sheet.

11. A positioning control system as set forth in claim 1, wherein the trajectory generating means calculates the target trajectory which makes a derivative of high order of a target acceleration curve zero at the time of the start of movement of the controlled device and at the time of completion of movement thereof, in accordance with the moving distance designated by a host device and a resonance frequency characteristics which the controlled device per se has, and wherein the follow control means control the driving means so that the controlled device is moved following the target trajectory to be positioned at the designated position.

12. A positioning control system for a magnetic head on a magnetic disk, comprising:

an actuator for moving and positioning said magnetic head to a designated track position on said magnetic disk;

position detecting means for detecting the track position of said magnetic head; and arithmetic control means for controlling said actuator in accordance with the track position of said magnetic head detected by said position detecting means and said designated track position, wherein said arithmetic control means includes:

moving time calculating means for calculating a target moving time for moving said magnetic head by a certain moving distance from a current track position of said magnetic head to said designated track position thereof;

gain calculating means for calculating a gain in accordance with said target moving time and said moving distance;

trajectory calculating means for calculating a target trajectory using an algebraic polynomial represented by said target moving time, said gain and an elapsed time, said algebraic polynomial at least making a target track position said designated track position when said elapsed time is equal to the target moving time; and following control means for controlling said actuator in accordance with said target trajectory calculated by said trajectory calculator and the track position of said magnetic head detected by said position detecting means, while causing the track position of said magnetic head to follow said target trajectory.

13. A positioning control system as set forth in claim 12, wherein the system further comprises position correcting means which stores a position correction value that is calculated by taking into account an amount of displacement of the controlled device in a given position, and wherein the trajectory generating means predicts a position correction value when the movement of the controlled device is completed in accordance with the current position of the controlled device and the calculated target moving time with reference to the position correcting means, and corrects previously the target trajectory in accordance with the predicted position correction value, and wherein the follow control means positions the control device while causing the same to follow the corrected target trajectory.

14. A positioning control system as set forth in claim 12, wherein the system further comprises:

calculating means which predicts and calculates the target moving time as a function of the current position of the controlled device and the entire moving distance; and position correction means which stores a position correction value that is calculated by taking into account an amount of displacement of the controlled device in a given position, and wherein a true entire moving distance from the start of movement of the controlled device to the completion thereof is adapted to be sequentially calculated, in the calculating means and the position correcting means.

15. A positioning control system as set forth in claim 14, wherein an amplitude of the target trajectory is adapted to be corrected using the approximate entire moving distance obtained by a sequential approximation, and to be calculated the target trajectory taking into account the accuracy of distance equal to or smaller than a track pitch.

16. A positioning control system as set forth in claim 15, wherein the controlled device is adapted to be positioned taking into account the correction of the amplitude of the target trajectory, only when the entire moving distance is relatively small.

17. A positioning control system for a magnetic head on a magnetic disk comprising:

an actuator for moving and positioning the magnetic head at the designated track position;

position detecting means for detecting the track position of the magnetic head;

arithmetic control means for controlling the actuator in accordance with the track position of the magnetic head detected by the position detecting means and the designated track position; and a position correction table which stores a position correction value that is calculated taking into account an amount of displacement of the magnetic head in a given track position on the magnetic disk, wherein the arithmetic control means includes:

trajectory generating means for calculating target trajectory in accordance with an entire moving distance between a current track position of the magnetic head and the designated track position; and follow control means for controlling the actuator in accordance with the target trajectory from the trajectory generating means and the position of the magnetic head detected by the position detecting means, said follow control means causing said actuator to move the magnetic head to follow the target trajectory, and wherein the trajectory generating means predicts a position correction value in accordance with the target moving time with reference to the position correction table, and corrects the previous target trajectory in accordance with the predicted position correction table, and controls the actuator so that the magnetic head is moved following the target trajectory to be positioned at the designated track position.

* * * * *

UNITED STATES PATENT AND TRADEMARK OFFICE
CERTIFICATE OF CORRECTION

PATENT NO. : 5,469,414

DATED : November 21, 1995

INVENTOR(S) : Okamura

Page 1 of 2

It is certified that error appears in the above-indentified patent and that said Letters Patent is hereby corrected as shown below:

Column 1, line 35, delete "shoulds" and insert --should--.

Column 1, line 35, delete "displacements" and insert --displaced--.

Column 2, line 48, delete "=" and insert --x--.

Column 3, line 35, delete "includes" and insert --include--.

Column 3, line 61, delete "13" and insert --4--.

Column 7, line 61, delete "wing" and insert --showing--.

Column 9, line 14, delete "2" first occurrence.

Column 13, line 24, delete "2 Tu" and insert --2Tu--.

Column 13, line 55, delete "<" and insert --≥--.

UNITED STATES PATENT AND TRADEMARK OFFICE
CERTIFICATE OF CORRECTION

PATENT NO. : 5,469,414
DATED : November 21, 1995
INVENTOR(S) : Okamura

It is certified that error appears in the above-indentified patent and that said Letters Patent is hereby corrected as shown below:

Column 13, line 56, delete "1" and insert -- -1 --.

Column 16, line 20, delete "84 M" and insert --84M--.

Column 16, line 53, delete "B" and insert --6--.

Column 17, line 54, delete "al" and insert --a1--.

Column 20, line 16, delete "a".

Column 28, line 3, delete "meads" and insert --means--.

Column 27, line 29, delete "g" and insert --j--.

Column 27, line 31, delete "g" and insert --j--.

Signed and Sealed this

First Day of April, 1997

Attest:

BRUCE LEHMAN

Attesting Officer

Commissioner of Patents and Trademarks